(12) United States Patent
Higashimura et al.

(10) Patent No.: US 6,747,554 B1
(45) Date of Patent: Jun. 8, 2004

(54) NETWORK SURVEILLANCE UNIT

(75) Inventors: Mamoru Higashimura, Yokohama (JP); Manabu Nakamura, Yokohama (JP); Junichi Hamada, Yokohama (JP); Motohiro Misawa, Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/487,800

(22) Filed: Jan. 20, 2000

(30) Foreign Application Priority Data

Jan. 21, 1999 (JP) .......................... 11-012722
Dec. 1, 1999 (JP) .......................... 11-342535

(51) Int. Cl.[7] ............................................. G08B 29/00
(52) U.S. Cl. ..................................... 340/506; 340/517
(58) Field of Search ................................ 340/506, 531, 340/534, 571, 573.1, 516, 517, 540, 541; 348/143, 153, 154, 156; 382/100, 115; 345/418, 719

(56) References Cited

U.S. PATENT DOCUMENTS 5,237,408 A * 8/1993 Blum et al. ................. 358/108
6,002,427 A * 12/1999 Kipust ........................ 340/571
6,185,316 B1 * 2/2001 Buffam ....................... 382/115
6,292,098 B1 * 9/2001 Ebata et al. ................. 340/506
6,304,262 B1 * 10/2001 Maloney et al. ............. 345/418

FOREIGN PATENT DOCUMENTS

FR    2713806       6/1995
GB    2325548      11/1998

OTHER PUBLICATIONS

European Search Report dated May 18, 2001.

* cited by examiner

Primary Examiner—Van Trieu

(57) ABSTRACT

In a network surveillance unit, a video input unit inputs image information output from a video output device such as a camera or a switcher. A coded image storage unit codes and accumulates the image information. An alarm management unit detects the presence or absence of alarm generation from an alarm generating device, and stores the alarm information. A communication unit receives a request from a display terminal through a network, and transmits the coded image accumulated in the coded image storage unit or the alarm information accumulated in the alarm management unit according to the request.

40 Claims, 28 Drawing Sheets

NETWORK SURVEILLANCE UNIT

BACKGROUND OF THE INVENTION

The present invention relates to a video transmission technique through a network, and especially to a technique for monitoring alarm information due to an image on monitor equipment or a sensor by means of a monitor of such as a remote computer.

A surveillance system in the prior art comprises a monitor camera, a monitor video equipment such as a switcher, an image display monitor, and a coaxial cable for connecting the various equipment described above for transmitting video and control information, wherein the person in charge of monitor is required to constantly watch the monitor installed at a predetermined place such as a security room. Also, a dedicated line in a system separate from the video coaxial cable for image is used for transmission of the alarm information.

Also, in the conventional image transmission apparatus of network type, the image transmission or the monitor equipment control through a network connected to a personal computer (PC) is realized by mounting a dedicated software on the personal computer.

Further, in the case where the conventional image transmission apparatus of network type is connected to a PC for setting the operating environment, the availability of only one connector with the PC makes it necessary to remove the apparatus from a rack for setting the operating environment of the apparatus or updating the program by connecting directly to the PC after installing the apparatus on the rack.

Also, in the conventional image transmission apparatus of network type, various control commands are received and processed one by one and a response is sent from and to a display terminal through a network accompanied by a considerable delay.

The conventional network image transmission apparatus, however, has the following problems.

As the first problem, the network distribution of an image from security equipment such as a camera or a switcher, the log recording of alarm generation information from a sensor or the security equipment, and the distribution of the alarm information are realized by different devices, so that it is difficult to relate the image and the alarm generation information to each other.

As the second problem, the provision of means for coding and storing the image corresponding to each of image input channels from a camera or a video output device connected to a network surveillance unit increases the number of component parts resulting in a high cost.

As the third problem, the display capabilities and the display formats varied from one terminal to another are required to be handled efficiently in order to meet the requirement of the various types of display terminals including the personal computer (PC), the portable terminals such as the portable telephone and the PDA and the computerized home appliances such as TV.

As the fourth problem, images of a plurality of channels using image coding means and storage means of one system, each of which can process an image of only one channel at the same time, cannot be displayed on the same terminal merely by switching the image input channel.

As the fifth problem, only the latest image is stored in a conventional coded image storage system, so that it is difficult to acquire the alarm image before the alarm generation.

As the sixth problem, in the case where the second alarm is generated while the series of the first alarm images are stored, the first alarm image is required depending on applications or the second image is required depending on applications.

As the seventh problem, a special and dedicated software is required for acquiring and displaying a list of alarm information and an alarm image.

As the eighth problem, in the case where the video transmission ability is higher than the input image coding ability in terms of the frame rate of image, the dual transmission of the image of the same frame results in the wasteful generation of the video transmission band.

As the ninth problem, the provision of image coding means of a single system makes it impossible for the conventional network image transmission apparatus to transmit images of different channels to a plurality of display terminals in response to image acquisition requests through a plurality of different channels from the different display terminals.

As the tenth problem, in the case where a screen displayed on a display terminal is changed in accordance with the internal setting value of an apparatus, a conventional HTML file transmission method requires the production and accumulation in the transmission apparatus of network type, of HTML files in the number proportional to the number of patterns of the setting value.

As the 11th problem, in the case where a connector to a setting PC is arranged in the rear portion of a housing, the housing is required to be removed from a rack when connecting to the PC, while in the case where the connector to the PC is arranged on the front portion of the housing, the connecting cable suspended on the front surface of the rack stands in the way of mounting the apparatus connected fixedly with a device on the rack.

As the 12th problem, when controlling the monitor equipment having only simple control instructions in case of transmission delay in the network, a series of process from start to end of the operation requires a considerable time or the person operating the monitor equipment cannot perform the control operation with an intended accuracy in terms of the change amount.

SUMMARY OF THE INVENTION

In order to solve the aforementioned problems, according to the first aspect of the present invention, there is provided a network surveillance unit having a configuration comprising: an image input unit for being supplied with image information output from a video output device such as a camera or a switcher; a coded image storage unit for coding and accumulating the image information; an alarm management unit for detecting alarm generation from an alarm generating device and for storing alarm information; and a communication unit for receiving a request from a display terminal through a network and for transmitting the coded image accumulated in the coded image storage unit or the alarm information accumulated in the alarm management unit in response to the request.

The configuration mentioned above permits the display terminal to acquire the image and the alarm generation information from the monitor equipment through the network.

According to the second aspect of the present invention, there is provided a network surveillance unit having a configuration comprising: in addition to the configuration according to the first aspect, an image input switching unit connected to a plurality of video output devices and capable of switching to an arbitrary channel.

The configuration mentioned above permits the image information and the alarm information of a plurality of channels within a monitor area to be displayed on the display terminal through the network.

According to the third aspect of the present invention, there is provided a network surveillance unit having a configuration comprising: in addition to the configuration according to the first aspect, a terminal-wise display format conversion unit for shaping the image information and the alarm information into the display format for the browsing means (browser) on a personal computer (PC).

The configuration mentioned above permits a remote PC to acquire and display the image information and the alarm information within the monitor area through the network by the operation of the browser operating on the PC.

According to the fourth aspect of the present invention, there is provided a network surveillance unit having a configuration comprising: in addition to the configuration according to the first or second aspect, a terminal-wise display format conversion unit for shaping the image information and the alarm information into a display format for WWW browsing means (browser) adapted to be built in TV and a portable terminal meeting internet requirement.

The configuration mentioned above permits the TV and the portable terminal meeting the requirement for a remote web to acquire and display the image information and the alarm information within the monitor area through the network by the operation of the browser operating on the terminal.

According to the fifth aspect of the present invention, there is provided a network surveillance unit having a configuration comprising: in addition to the configuration according to the first aspect, a plurality of image input units; and a multi-screen image synthesis unit for synthesizing one image information from the image information from the plurality of image input units.

The configuration mentioned above permits the image information input from a plurality of channels to be acquired and displayed on a single display terminal at the same time.

According to the sixth aspect of the present invention, there is provided a network surveillance unit having a configuration comprising: in addition to the configuration according to the first or second aspect, an alarm management unit for instructing the coded image storage unit to store the alarm image upon alarm generation; and an alarm image storage unit for storing the image stored in the coded image storage unit, as an alarm image in response to an instruction from the alarm management unit.

The configuration mentioned above permits the network surveillance unit to store the alarm images and log information within the monitor area upon the alarm and a remote display terminal to display the alarm images and log information on the particular display terminal through the network.

According to the seventh aspect of the present invention, there is provided a network surveillance unit having a configuration comprising: in addition to the configuration according to the first or second aspect, an alarm management unit for instructing the coded image storage unit to store the alarm image upon alarm generation; and an alarm image storage unit for storing a plurality of the images stored in the coded image storage unit, as a series of alarm images upon and subsequent to the instruction from the alarm management unit.

The configuration mentioned above permits the network surveillance unit to store a series of the alarm images and log information within the monitor area after the alarm generation, and a remote display terminal to display the series of the alarm images and log information on the display terminal through the network.

According to the eighth aspect of the present invention, there is provided a network surveillance unit having a configuration comprising: in addition to the configuration according to the seventh aspect, an alarm number management and storage unit for storing at least any two of information including the number, storage time and frame rate of the alarm images stored in the alarm image storage unit; and a coded image storage unit for storing the alarm image in accordance with information of the alarm number management and storage unit upon alarm generation.

The configuration mentioned above permits the network surveillance unit to set and store the number of a series of image information arbitrarily within the monitor area after the alarm generation, and to display the series of the alarm images on the display terminal through the network.

According to the ninth aspect of the present invention, there is provided a network surveillance unit having a configuration in which the coded image storage unit in the configuration according to the 6th or 7th aspect includes image storage means for always storing a plurality of images from the past to the latest one, and stores the past image at the time of alarm generation as an alarm image before the alarm generation.

The configuration mentioned above permits the network surveillance unit to store a series of alarm images and log information within the monitor area before and after the alarm generation, and a remote display terminal to display the series of the alarm images and log information on the display terminal through the network.

According to the tenth aspect of the present invention, there is provided a network surveillance unit having a configuration comprising: in addition to the configuration according to the ninth aspect, an alarm number management and storage unit for storing at least two of information including the number, storage time and frame rate of alarm images before alarm generation stored in the alarm image storage unit of the coded image storage unit; and a coded image storage unit for storing the alarm image in accordance with information of the alarm number management and storage unit upon the alarm generation.

The configuration mentioned above permits the network surveillance unit to set and store the number of a series of image information arbitrarily within the monitor area before and after the alarm generation, and the series of the alarm images to be displayed on the display terminal through the network.

According to the 11th aspect of the present invention, there is provided a network surveillance unit having a configuration comprising: in addition to the configuration according to the 7th aspect, an alarm management unit for instructing the coded image unit to suspend the accumulation of a first alarm image and store a second alarm image upon the second alarm generation while the first alarm image is being stored.

The configuration mentioned above permits an appropriate image storage processing to be realized in accordance with the application involved upon the continuous alarm generation within a short time.

According to the 12th aspect of the invention, there is provided a network surveillance unit having a configuration comprising: in addition to the configuration according to the 7th aspect, an alarm management unit for instructing the coded image unit not to store a second image but to store only second alarm generation information in a case where a second alarm is generated while a first alarm image is being stored.

The configuration mentioned above permits an appropriate alarm image storage processing suiting the application involved in a case where the alarms are generated continuously within a short time.

According to the 13th aspect of the present invention, there is provided a network surveillance unit having a configuration comprising: in addition to the configuration according to the first, second or sixth aspect, a communication unit for receiving an alarm list request from the display terminal; an alarm HTML conversion unit for producing an alarm information list of HTML format based on the alarm information and the alarm images and log information of the alarm management unit; and an HTTP server for interpreting the alarm image list request and for transmitting the alarm list.

The configuration mentioned above permits the alarm information and the alarm images and log information held in the network surveillance unit to be displayed on the display terminal using a common WWW browser.

According to the 14th aspect of the present invention, there is provided a network surveillance unit having a configuration comprising: in addition to the configuration according to the 13th aspect, an alarm HTML conversion unit for converting a specific character string in the HTML file into an alarm number and an alarm image number both of which are designated by the terminal.

The configuration mentioned above including the alarm HTML conversion unit permits the alarm image to be reproduced and operated easily by the WWW browser on the display terminal.

According to the 15th aspect of the present invention, there is provided a network surveillance unit having a configuration comprising: in addition to the configuration according to the 14th aspect, an alarm HTML conversion unit for converting a specific character string in the HTML file into an image number immediately following an alarm image number designated by the terminal, an image number immediately preceding to the alarm image number, and a first image number, a last image number and an image number immediately after alarm generation which are designated by the terminal.

The configuration mentioned above including the alarm HTML conversion unit permits the alarm image to be reproduced and operated easily by the WWW browser on the display terminal.

According to the 16th aspect of the present invention, there is provided a network surveillance unit having a configuration comprising: in addition to the configuration according to the sixth aspect, an alarm image reproduction control unit for controlling a reproduction of the alarm image by extracting an image to be transmitted out of a series of the alarm images accumulated in the alarm image storage unit in accordance with receiving intervals of a request for latest image transmitted from the display terminal.

The configuration mentioned above permits the network surveillance unit to realize the reproduction of the alarm image on the display terminal through the network.

According to the 17th aspect of the present invention, there is provided a network surveillance unit having a configuration comprising: in addition to the configuration according to the sixth aspect, an alarm image reproduction control unit for controlling a special reproduction of the alarm image by extracting an image to be transmitted out of a series of the alarm images accumulated in the alarm image storage unit in accordance with a request command received by communication with the display terminal and receiving intervals of the request command.

The configuration mentioned above permits a special reproduction including a rapid feed, rewind, frame skip or slow reproduction of the alarm image on the display terminal.

According to the 18th aspect of the present invention, there is provided a network surveillance unit having a configuration comprising: in addition to the configuration according to the first, second or sixth aspect, an alarm management unit for instructing a communication unit to transmit the alarm information upon alarm generation; an alarm message production unit for producing an alarm message of a format in which alarm information conforms to the browsing means of the terminal; and the communication unit for transmitting the alarm message in accordance with a request of the alarm management unit.

The configuration mentioned above permits the network surveillance unit to transmit the alarm information to the PC through the internet upon alarm generation.

According to the 19th aspect of the present invention, there is provided a network surveillance unit having a configuration comprising: in addition to the configuration according to the first, second or sixth aspect, an alarm management unit for instructing a communication unit to transmit alarm information upon alarm generation; an alarm mail production unit for producing an internet mail including the alarm information; and the communication unit for transmitting the mail in accordance with a request of the alarm management unit.

The configuration mentioned above permits the network surveillance unit to transmit the alarm information through the internet to all the equipment communicable by the internet mail, including the PC, the portable telephone, the PDA and the pager upon the alarm generation.

According to the 20th aspect of the present invention, there is provided a network surveillance unit having a configuration comprising: in addition to the configuration according to the eighth or tenth aspect, an apparatus environment information storage unit for storing a list of an image data occupancy rate due to a recording capacity of the alarm image storage unit and a size and quality of the image; and an alarm number management and storage unit for calculating a maximum number of storage of the alarm image storage unit in a current environment setting of the network surveillance unit based on information of the apparatus environment information storage unit to limit a storage number of the alarm images to a maximum storage number.

The configuration mentioned above permits the storage of the alarm image to maximize the use of the storage area in the network surveillance unit.

According to the 21st aspect of the present invention, there is provided a network surveillance unit having a configuration comprising: in addition to the configuration according to the first or second aspect, an image input unit for adding an identifier varied from one frame to another at the time of image input; and an image identifier production unit for producing the identifier.

The configuration mentioned above makes it possible to identify the image information stored in the network surveillance unit, for each frame.

According to the 22nd aspect of the present invention, there is provided a network surveillance unit having a configuration comprising: in addition to the configuration according to the 21st aspect, a communication unit for transmitting a latest image stored in the coded image storage unit to the network in a case where the identifier of the latest image coded in the coded image at the time of image transmission is different from the identifier of the image at the preceding time of transmission, and storing the latest image different from the identifier of the preceding image in the coded image storage unit to transmit the particular latest image to the network in a case where the two identifiers are the same.

The configuration mentioned above makes it possible to reduce the image information amount transmitted to the network.

According to the 23rd aspect of the present invention, there is provided a network surveillance unit having a configuration comprising: in addition to the configuration according to the 21st aspect, a communication unit for transmitting a latest image stored in the coded image storage unit to the network in a case where the identifier of the latest image is different from the identifier of the preceding image transmitted, and transmitting to the network the information to the effect that the latest image is not existent in a case where the two identifiers are the same.

The configuration mentioned above can reduce the image information amount transmitted to the network and realize the processing corresponding to the update rate of the input image at the terminal.

According to the 24th aspect of the present invention, there is provided a network surveillance unit having a configuration comprising: in addition to the configuration according to the first aspect, a communication unit for receiving a control instruction for a camera or a video output device from the terminal through the network; a camera control unit for interpreting the control instruction received by the communication unit and converting it into a control instruction specific to the camera or the video output device; and a coaxial multiplexing unit for multiplexing the control instruction output of the camera control unit and the video input from the camera or the video output device to input/output them with the same coaxial cable.

The configuration mentioned above permits the camera or the video output device to be controlled simply with the video coaxial cable.

According to the 25th aspect of the present invention, there is provided a network surveillance unit having a configuration comprising: in addition to the configuration according to the second aspect, a communication unit for receiving a control instruction for the camera or the video output device from the terminal through the network; a camera control unit for interpreting the control instruction received by the communication unit and converting it into a control instruction specific to the camera or the video output device; a coaxial multiplexing unit for multiplexing the control instruction output of the camera control unit and the video input from the camera or the video output device to input/output them with the same coaxial cable; and a coaxial input/output switching unit for switching the control instruction and the video input by switching the connection of the coaxial cable of a plurality of channels.

The configuration mentioned above can control the camera or the video output device simply by the video coaxial cable even in the case where the image input has a plurality of channels.

According to the 26th aspect of the present invention, there is provided a network surveillance unit having a configuration comprising: in addition to the configuration according to the 25th aspect, an alarm management unit for instructing the coaxial input/output switching unit to switch the coaxial channel and the camera control unit to control the camera in accordance with the setting registered in advance upon alarm generation.

The configuration mentioned above permits the alarm to be controlled simply by the video coaxial cable in operatively interlocked relation with the camera or the video output unit upon the camera generation.

According to the 27th aspect of the present invention, there is provided a network surveillance unit having a configuration comprising: in addition to the configuration according to the first or second aspect, a coaxial multiplexing unit for multiplexing the video input from the camera or the video output device with the power supplied from the power supply in the network surveillance unit to the camera or the video output device to input/output the multiplexed power with the same coaxial cable.

The configuration mentioned above permits the power to be supplied from the network surveillance unit to the camera or the video output device simply by the video coaxial cable.

According to the 28th aspect of the present invention, there is provided a network surveillance unit having a configuration comprising: in addition to the configuration according to the first or second aspect, an alarm management unit for sending an instruction for external control to the external equipment control unit in accordance with the setting registered in advance upon alarm generation; and an external equipment control unit for converting the instruction for external control to an instruction specific to the external equipment to be controlled and for transmitting it to the external equipment.

The configuration mentioned above permits the external monitor equipment to be controlled by the network surveillance unit upon the alarm generation or by the operation from the display terminal through the network.

According to the 29th aspect of the present invention, there is provided a network surveillance unit having a configuration comprising: in addition to the configuration according to the first aspect, a coaxial multiplexing unit for demultiplexing the alarm input and the image input which are multiplexed and transmitted from the camera or the video output device through the coaxial cable, the video signal being sent to the image input unit, and the alarm signal being sent to the alarm management unit.

The configuration mentioned above permits the alarm to be received from the camera or the video output device simply by the video coaxial cable.

According to the 30th aspect of the present invention, there is provided a network surveillance unit having a configuration comprising: in addition to the configuration according to the second aspect, a coaxial multiplexing unit for demultiplexing the alarm input and the image input which are multiplexed and transmitted from the camera or the video output device through the coaxial cable, the video signal being sent to the image input unit, and the alarm signal being sent to the alarm management unit; and a coaxial input/output switching unit for switching the alarm input and the video input by switching the connection of the coaxial cable of a plurality of channels.

The configuration mentioned above permits the alarm to be received from the camera or the video output device simply by the video coaxial cable even in the case where the video input has a plurality of channels.

According to the 31st aspect of the present invention, there is provided a network surveillance unit having a configuration comprising: in addition to the configuration according to the 29th or 30th aspect, a coaxial multiplexing unit for multiplexing or demultiplexing the alarm input and the image input multiplexed and transmitted from the camera or the video output device through the coaxial cable and the control signal to the camera or the video output device.

The configuration mentioned above permits the camera or the video output device to be controlled and the alarm to be received from the camera or the video output device simply by the video coaxial cable.

According to the 32nd aspect of the invention, there is provided a network surveillance unit having a configuration comprising: in addition to the configuration according to the 31st aspect, an alarm management unit for instructing the coaxial input/output switching unit to switch the coaxial channel and the camera control unit to control the camera in accordance with the setting registered in advance upon alarm generation from the camera or the video output device.

The configuration mentioned above can realize an operation interlocked with the alarm upon receipt of the alarm from the camera or the video output device simply by the video coaxial cable.

According to the 33rd aspect of the present invention, there is provided a network surveillance unit having a configuration comprising: in addition to the configuration according to the second aspect, a coded image storage unit including an image storage unit corresponding to each of a plurality of image input channels; a period interlocked switching unit for instructing the image input unit and the coded image storage unit to switch the channel periodically and sequentially for each input of one frame of image; and a communication unit for acquiring the image of the channel designated by the display terminal from the image storage unit of the designated channel in the coded image unit and transmitting it to the network.

With the configuration mentioned above, images temporally parallel for all the channels can be stored in the network surveillance unit by the image input units and the coding means fewer in number than the image input channels, and the real-time images of a plurality of channels can be acquired temporally in parallel from an arbitrary display terminal, thereby reducing the cost of the network surveillance unit.

According to the 34th aspect of the present invention, there is provided a network surveillance unit having a configuration comprising: in addition to the configuration according to the first or second aspect, an environment information storage unit for setting the operating environment of the network surveillance unit; an HTML file storage unit for storing the HTML environment information for constructing the screen on the display terminal; an environment information HTML conversion unit for converting a specific character string in the HTML file into the aforementioned setting of the operating environment; and an HTTP server unit for interpreting the HTML file request and for transmitting the HTML file after conversion.

The configuration mentioned above permits the display terminal to operate the network surveillance unit with the screen configuration corresponding to the setting of the network surveillance unit.

According to the 35th aspect of the present invention, there is provided a network surveillance unit having a configuration comprising: in addition to the configuration according to the first or second aspect, display lamps for displaying the connection, transmission condition, receiving condition with respect to the network and the operation mode on the front surface of the housing.

The configuration mentioned above permits the network surveillance unit to be connected to the network and facilitates the observation of the connection and the communication condition.

According to the 36th aspect of the present invention, there is provided a network surveillance unit having a configuration comprising: in addition to the configuration according to the first or second aspect, an interface with a PC on the front and back surfaces of the housing for setting the operating environment or updating the software in the surveillance unit.

The configuration mentioned above permits the operating environment of the network surveillance unit to be set and the software in the surveillance unit to be updated using the PC without the intermediary of the network.

According to the 37th aspect of the present invention, there is provided a network surveillance unit having a configuration comprising: in addition to the configuration according to the 36th aspect, an interface with a PC on both the front and rear surfaces of the housing; and a switch for switching the operation between the interfaces on the front and rear surfaces of the housing.

The configuration mentioned above permits the operating environment of the network surveillance unit to be set and the software in the surveillance unit to be updated by the PC without removing the network surveillance unit from the rack or the like regardless of the place or method of installation of the surveillance unit.

According to the 38th aspect of the invention, there is provided a network surveillance unit having a configuration comprising: in addition to the configuration according to the first or second aspect, means included in the housing for inputting the image from the camera or the video output device; and loop-through output means for outputting the image directly.

The configuration mentioned above makes it possible to confirm the image input from the camera or the video output device by the conventional monitor.

According to the 39th aspect of the present invention, there is provided a network surveillance unit having a configuration comprising: in addition to the configuration according to the 24th or 28th aspect, a camera control unit for transmitting a control instruction to the camera or the video output device; an HTTP server unit for decomposing a single composite operating instruction from the display terminal into a chain of basic control instructions for the camera control unit and sending it to the camera control unit; and a camera control unit for transmitting the basic control instructions sequentially to the camera or the video output device.

The configuration mentioned above permits the camera or the video output device having only basic control instructions to execute complicated control operations simply by the operation of a single button on the browser of the PC.

According to the 40th aspect of the present invention, there is provided a network surveillance unit having a configuration comprising: in addition to the configuration according to the 39th aspect, a camera control unit for transmitting control instructions to the camera or the video output device; an HTTP server unit for decomposing a single composite operating instruction from the display terminal into a chain of basic control instructions and instruction time intervals for the camera control unit and for sending it to the camera control unit; and the camera control unit for transmitting the basic control instructions sequentially to the camera or the video output device at appropriate time intervals.

The configuration mentioned above permits the camera or the video output device having only basic control instructions to execute complicated control operations simply by the operation of a single button on the browser of the PC, thereby improving the control accuracy even on the network accompanied by a delay.

DESCRIPTION OF THE PREFERRED EMBODIMENTS

Specific embodiments of the present invention will be explained with reference to FIGS. 1–28.

First Embodiment

Figure 1:
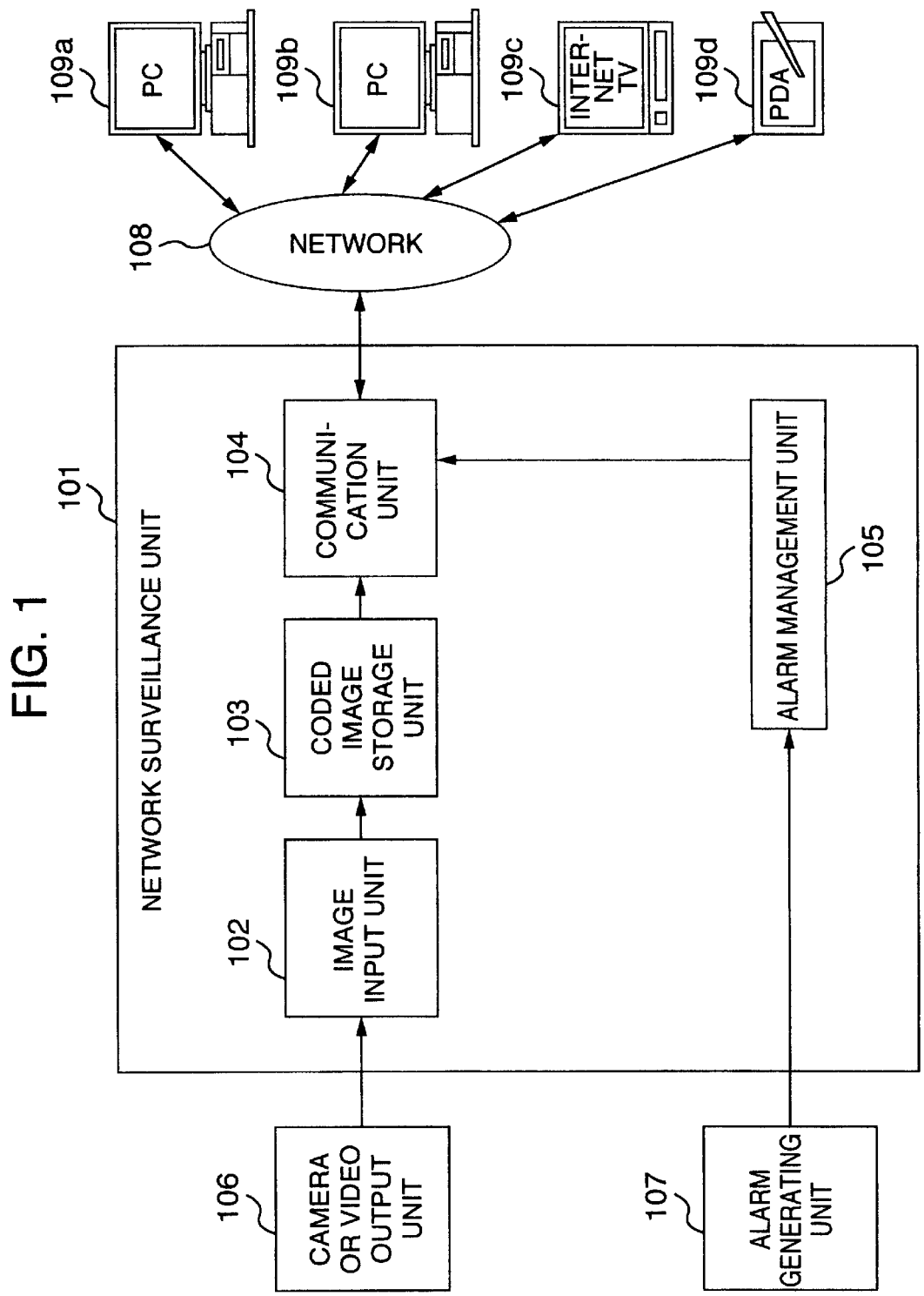
FIG. 1 is a block configuration diagram showing a network surveillance unit according to a first embodiment of the present invention.

FIG. 1 is a block configuration diagram showing a network surveillance unit according to a first embodiment of the present invention. A network surveillance unit 101 comprises: an image input unit 102 for being supplied with image information output from a video output device 106 such as a camera or a switcher; a coded image storage unit 103 for coding and accumulating the image information acquired by the image input unit 102; an alarm management unit 105 for detecting the presence or absence of an alarm generated from an alarm generating unit 107 and for storing the alarm information; and a communication unit 104 connected to display terminals 109a to 109d through a network 108 for transmitting the coded imaged accumulated in the coded image storage unit 103 or the alarm information accumulated in the alarm management unit 105 to the display terminals 109a to 109d through the network 108 at the request of the display terminals 109a to 109d.

The display terminals 109a to 109d communicate with the network surveillance unit 101 and display the coded image or the alarm information. A personal computer (PC), a TV meeting the Web requirement or a portable terminal such as a PDA or portable telephone can be used as the display terminals.

First, the image input unit 102 converts the image information transmitted by the camera or the video output device 106 into a data format easy to process in the network surveillance unit 101, and sends it to the coded image storage unit 103. An example of the conversion into the data format easily processed in the network surveillance unit 101 is the case in which the camera or the video output device 106 outputs only an analog image signal of NTSC format, so that the image input unit 102 performs the A/D conversion to convert the analog image signal into digital information of RGB format.

The coded image storage unit 103 stores the image information fetched by the image input unit 102, directly or after coding it according to JPEG, MPEG or the like.

The communication unit 104 transmits the coded image information stored in the coded image storage unit 103 to the network 108 at an image information storage timing in the coded image storage unit 103. Alternatively, the communication unit 104 transmits the coded image information stored in the coded image storage unit 103 to the network 108 in compliance with an image acquisition request from the display terminals 109a to 109d through the network 108.

Also, the alarm management unit 105 monitors an alarm generation from the alarm generating device 107. When an alarm is generated by the alarm generating device 107, the unit 105 stores information on the alarm in the alarm management unit 105. An example of the information on the alarm generation is an alarm input terminal number of the network surveillance unit to which the alarm is input, the date and time of the alarm generation, and the type of the alarm.

The communication unit 104 transmits, as in the case of the image signal, the alarm information stored in the alarm management unit 105 to the network 108 at an alarm generation information storage timing in the alarm management unit 105 or in compliance with an alarm information acquisition request from the display terminals 109a to 109d through the network 108.

According to the embodiments described above, a remote terminal can acquire the image information and alarm information within the monitor area through a network, and display them.

Second Embodiment

Figure 2:
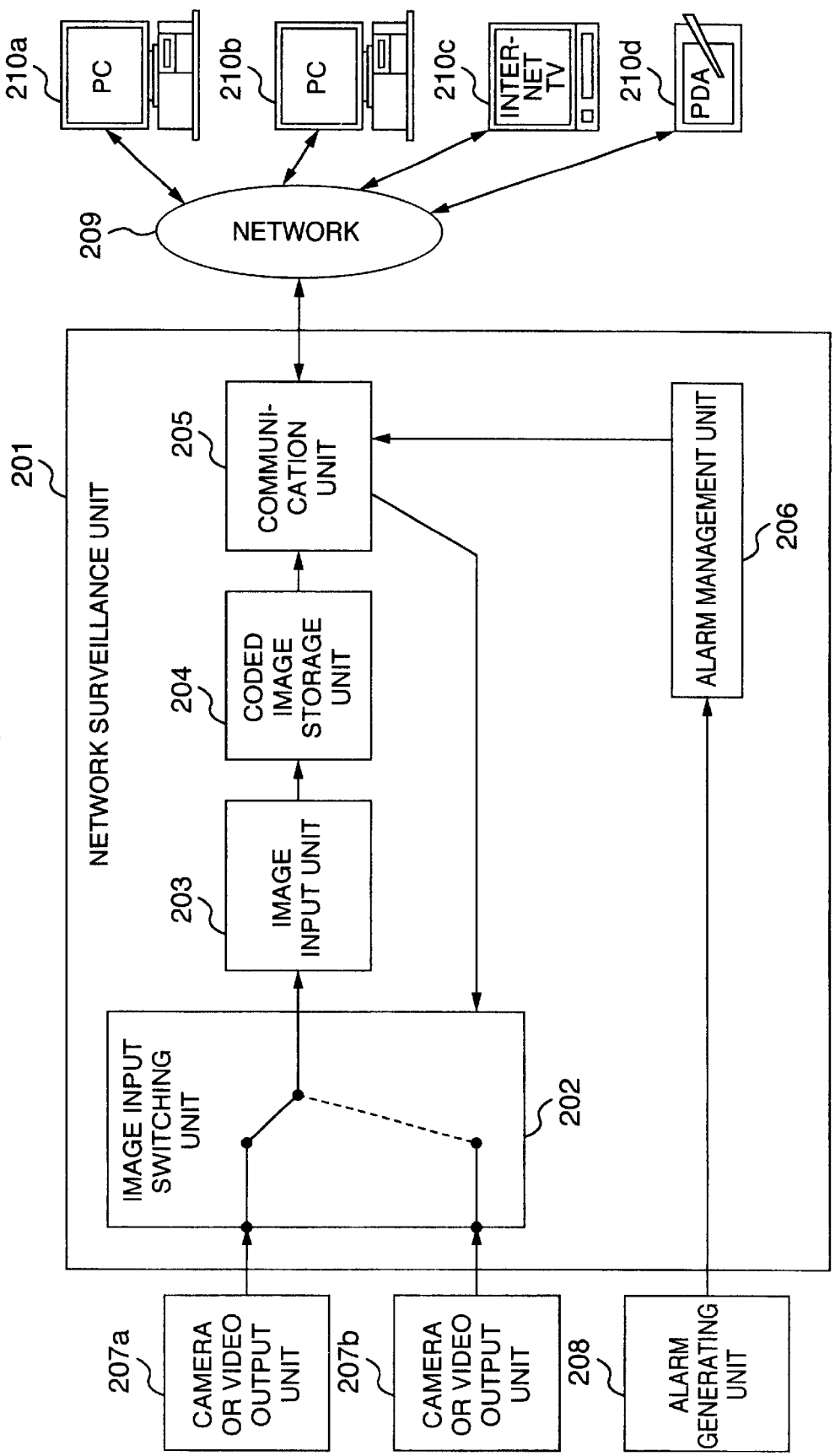
FIG. 2 is a block configuration diagram showing a network surveillance unit according to a second embodiment of the present invention.

FIG. 2 is a block configuration diagram showing a network surveillance unit according to a second embodiment of the present invention. In addition to the configuration of the first embodiment, the surveillance unit comprises: an image input switching unit 202 for switching the connection to cameras or video output devices 207a and 207b such as switchers; an image input unit 203 for inputting the image information output from a channel selected by the image input switching unit 202 out of the cameras or the video output devices 207a and 207b; and a communication nit 205 for receiving an image input channel switching request from display terminals 210a to 210d through a network 209 to instruct the image input switching unit 202 to switch the channel, as well as transmitting the coded image and the alarm information as in the first embodiment.

The communication unit 205 is connected to the network 209 and receives the channel switching request transmitted by the display terminals 210a to 210d to send the request to the image input switching unit 202.

The image input switching unit 202 connects the image input unit 203 with the channel designated by the communication unit 205 among the cameras or the video output devices 207a to 207b.

Then, the image information from the channel connected by the image input switching unit 202 among the cameras or the video output devices 207a to 207b is converted by the image input unit 203 into a data format easy to process in the network surveillance unit 201 to send the data format to the coded image storage unit 204.

In the way described above, the image information and the alarm information of a plurality of channels within the monitor area can be displayed through the network on the display terminals.

Also, the similar effect can be obtained by providing an image input unit for each image channel and providing an image input switching unit for switching the image information from the image input unit produces.

Third Embodiment

Figure 3:
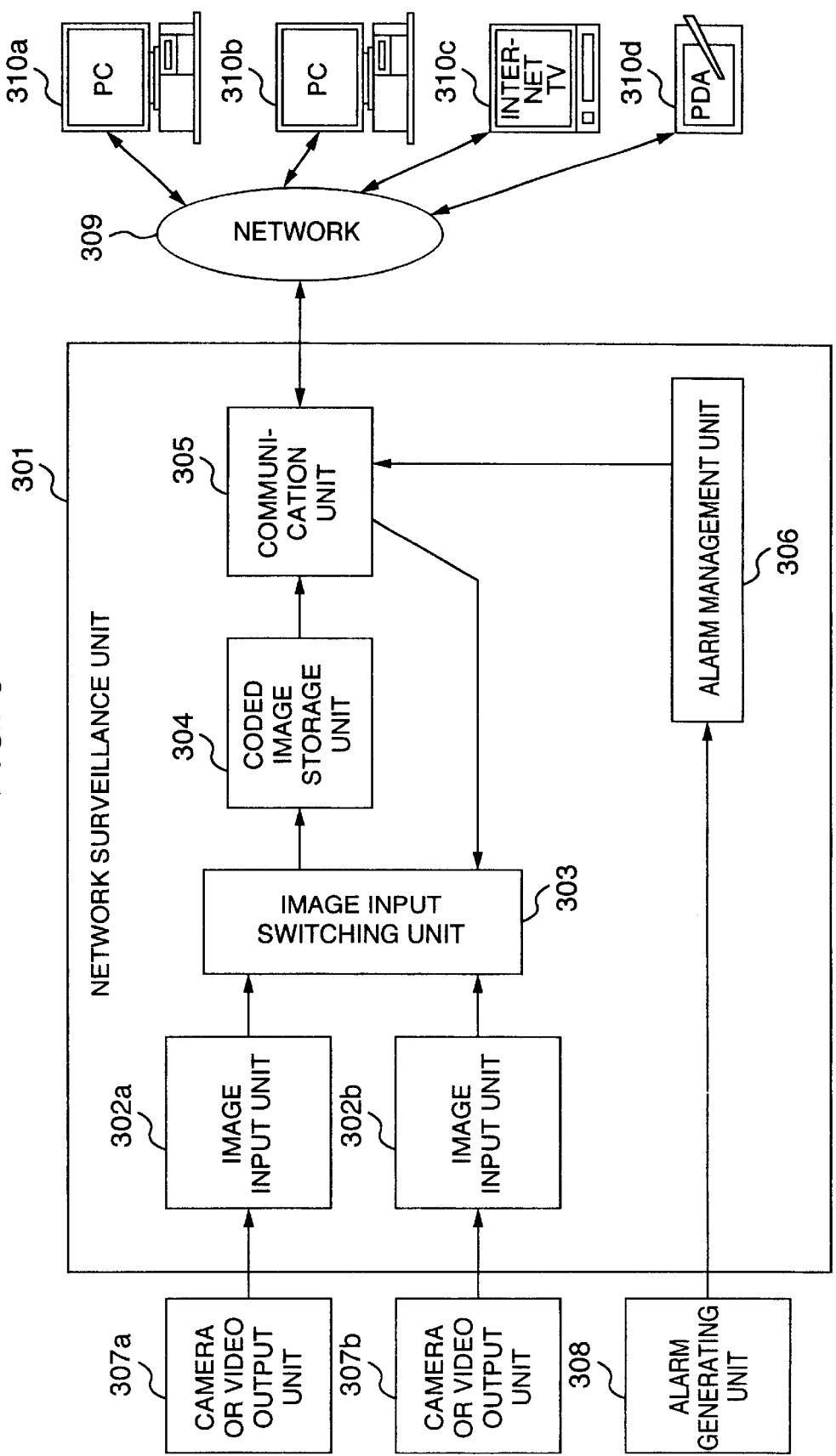
FIG. 3 is a block configuration diagram showing a network surveillance unit according to a third embodiment of the present invention.

FIG. 3 is a block configuration diagram showing a network surveillance unit according to a third embodiment of the present invention. In addition to the configuration of the first embodiment, the surveillance unit comprises: image input units 302a and 302b connected to cameras or video output devices 307a and 307b, respectively and for being supplied with image information output from the corresponding ones of the cameras or the video output devices 307a and 307b; an image input switching unit 303 for switching the connection between the video input units 302a and 302b and a coded image storage unit 304; and a communication unit 305 for transmitting the coded image and the alarm information like in the first embodiment, for receiving an image input channel switching request from display terminals 310a to 310d through artwork 309, and for instructing the channel switching to the image input switching unit 303.

The communication unit 305 is connected to the network 309, receives the channel switching request transmitted by the display terminals 310a to 310d, and sends the request to the image input switching unit 303.

The image input switching unit 303 connects the channel designated by the communication unit 305 among the image input units 302a and 302b corresponding to the cameras or the video output devices 307a and 307b, to the coded image storage unit 304.

In the image input units 302a and 302b, the image information transmitted by the corresponding cameras or video output devices 307a and 307b is converted into a data format easily processed in the network surveillance unit 301, and sent to the image input switching unit 303.

The image input switching unit 303 sends the image information from the switched channel of the image input units 302a and 302b, to the coded image storage unit 103.

In the way described above, the image information of the channels within the monitor area and the alarm information can be displayed on the display terminal through the network.

Fourth Embodiment

Figure 4:
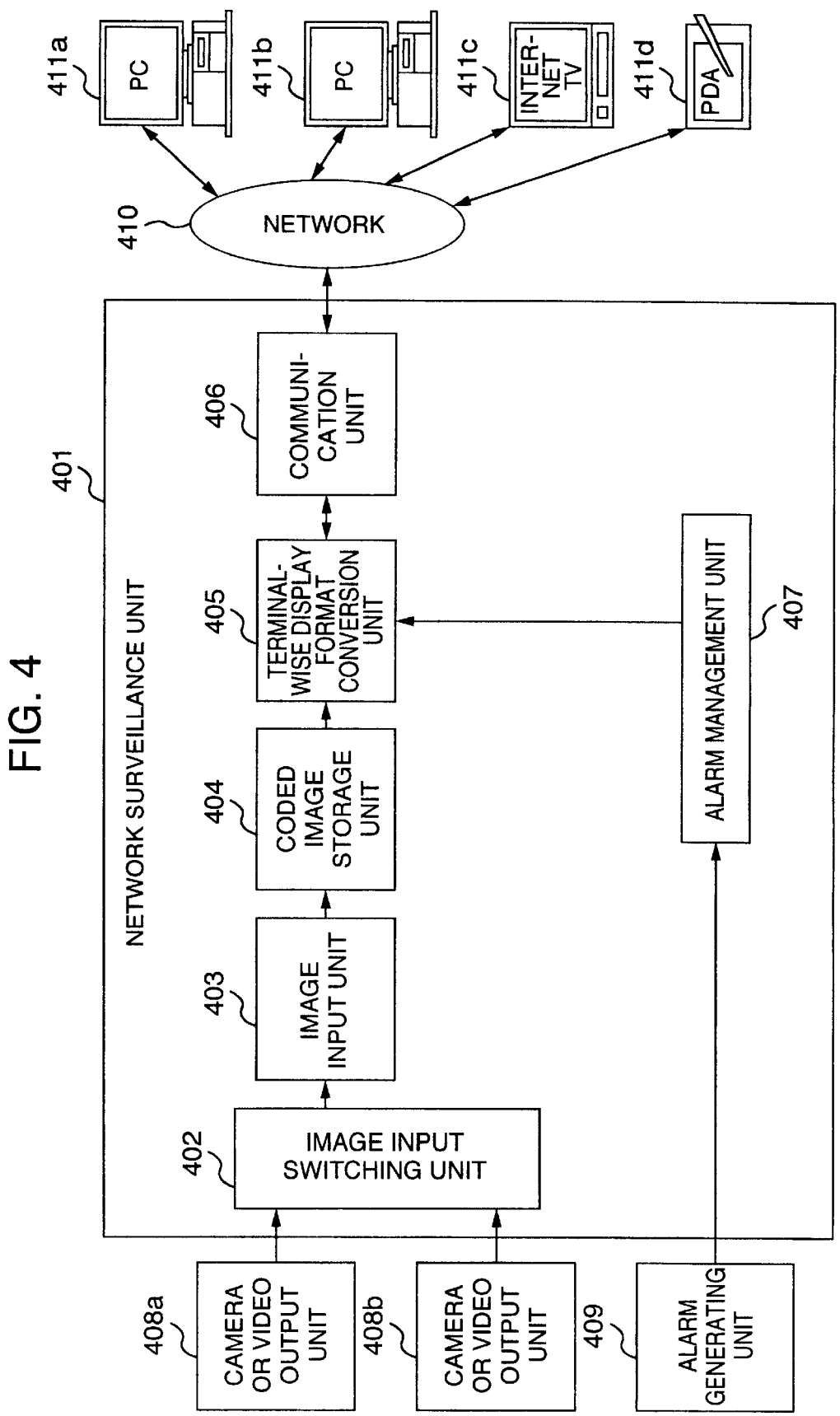
FIG. 4 is a block configuration diagram showing a network surveillance unit according to a fourth embodiment of the present invention.

FIG. 4 is a block configuration diagram showing a network surveillance unit according to a fourth embodiment of the present invention. In addition to the configuration of the first, second or third embodiment, the surveillance unit comprises: a terminal-wise display format conversion unit 405 for converting image information stored in a coded image unit 404, alarm information in an alarm management unit 404 and the structure of a display screen into a format corresponding to the types of the display terminals 411a to 411d; and a communication unit 406 connected to the display terminals 411a to 411d through a network 410 and for sending an information transmission request and terminal type information from the display terminals 411a to 411d to the terminal-wise display format conversion unit 405.

The communication unit 406 is connected to the network 410, receives the request for the image information or the alarm information and the terminal type information of the display terminals transmitted by the display terminals 411a to 411d, to the terminal-wise display format conversion unit 405.

The terminal-wise display format conversion unit 405 sends the coded image information in the coded image storage unit 404 or the alarm information in the alarm management unit 407 to the communication unit after converting them into the format corresponding to the terminal type.

As an example of the format corresponding to the terminal type, a standard HTML format is used when the display terminal is a PC or a computerized home appliance like a TV communicable with the internet. When the display terminal is a portable terminal such as the PAD or the portable telephone, the HTML format for the portable terminals such as the ConpactHTML is used.

Fifth Embodiment

Figure 5:
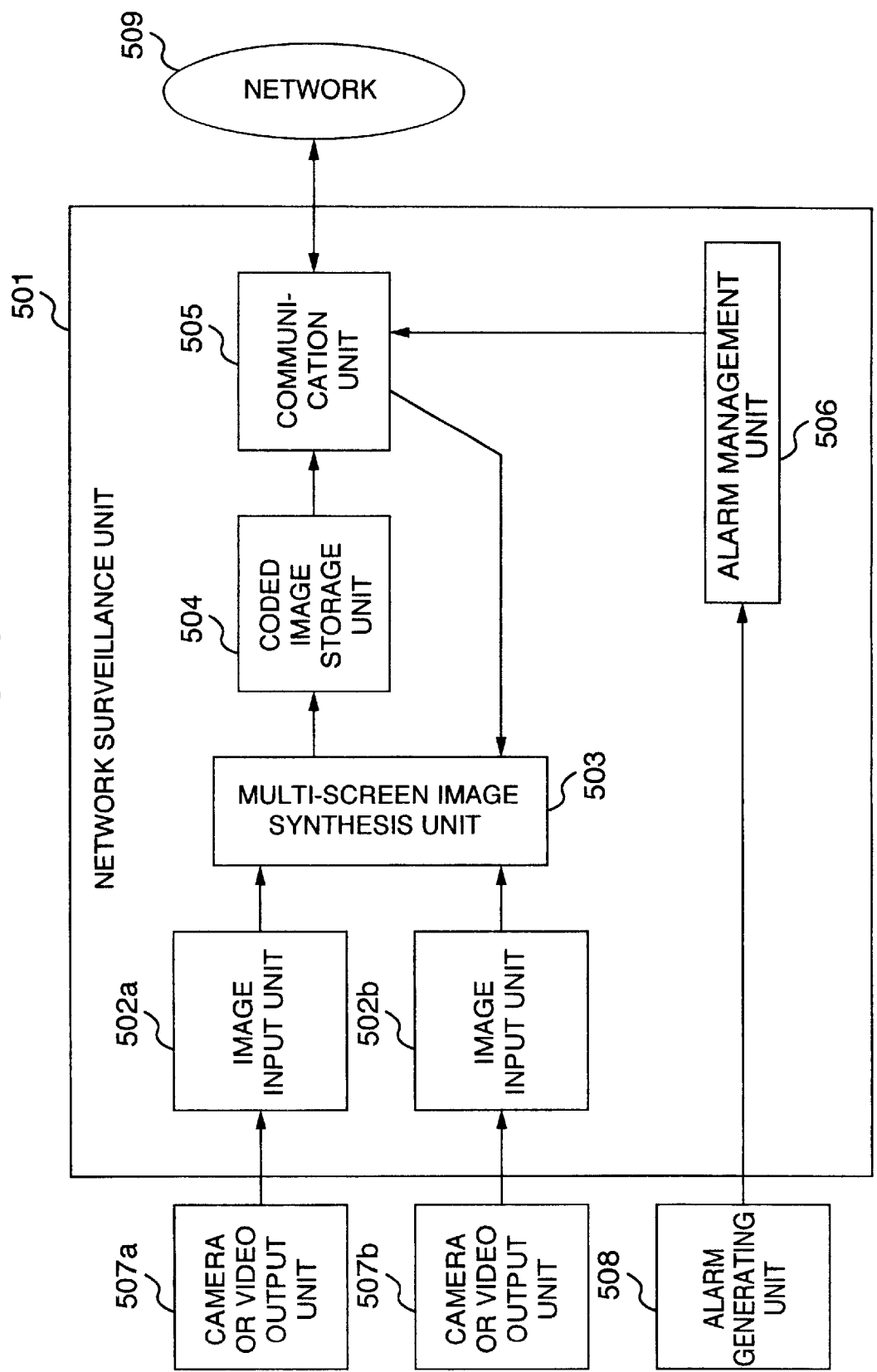
FIG. 5 is a block configuration diagram showing a network surveillance unit according to a fifth embodiment of the present invention.

FIG. 5 is a block configuration diagram showing a network surveillance unit according to a fifth embodiment of the present invention. In addition to the configuration of the first embodiment, the surveillance unit comprises: a multi-screen image synthesis unit 503 connected to cameras or video output devices 507a and 507b and for synthesizing image information output from the corresponding devices 507a and 507b into single image information.

Image input units 502a and 502b convert the image information transmitted by the corresponding cameras or video output devices 507a and 507b into a data format easy to process in the network surveillance unit 501, and sends it to the multi-screen image synthesis unit 503. The multi-screen synthesis unit 503 synthesizes the image information from the channels into the single image information, and sends it to coded image storage unit 504 as an image from one channel.

As described above, the image information input from a plurality of channels can be displayed at the same time on a single display terminal.

Also, communication unit 505 is connected to a network 509, receives the screen synthesis setting transmitted from the display terminals 510a to 510d, and sends it to the multi-screen image synthesis unit 503.

As described above, the selection of the channels synthesized by the multi-screen image synthesis unit 503 and the arrangement of each channel image in the synthesized image can be designated.

Sixth Embodiment

Figure 6:
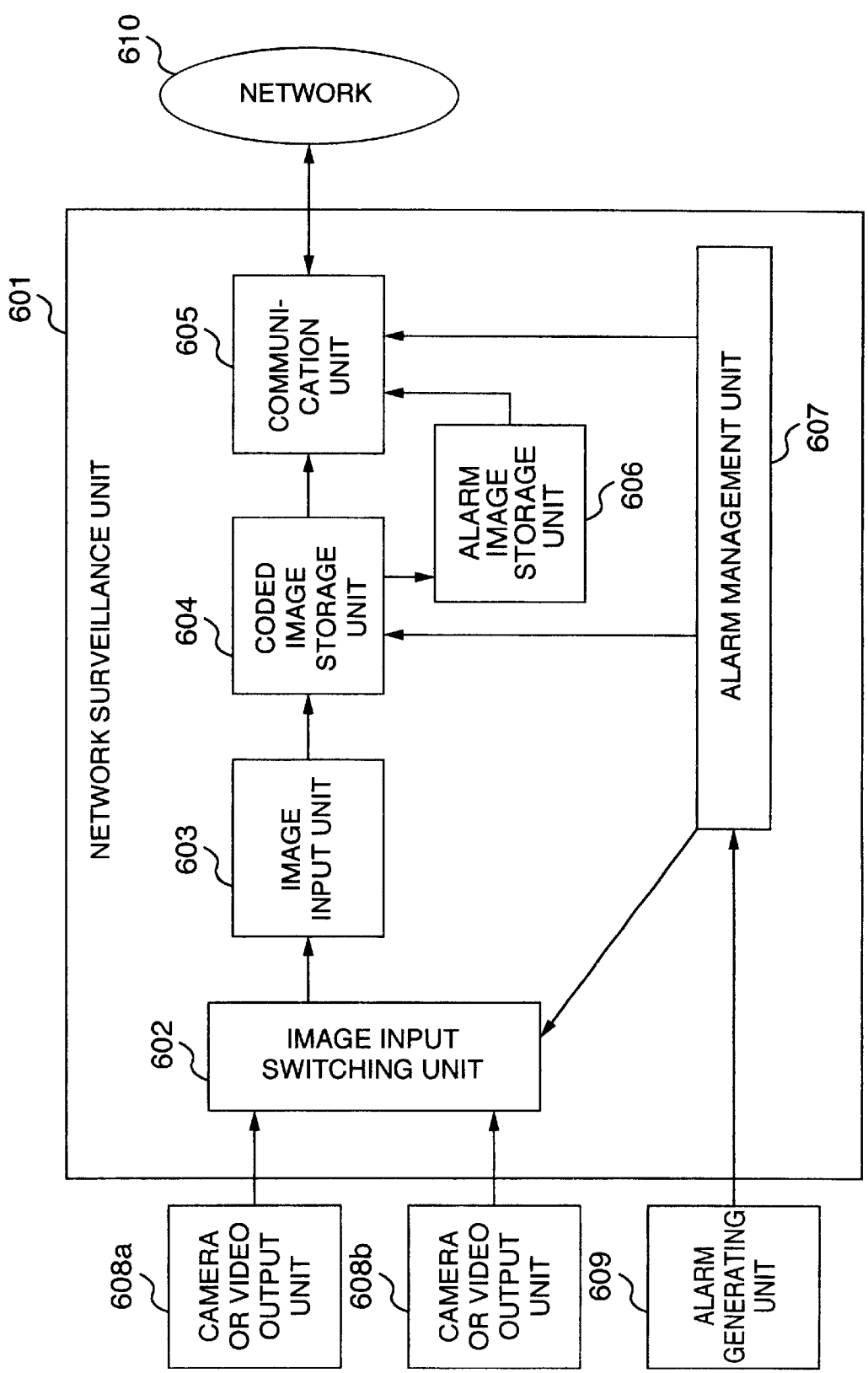
FIG. 6 is a block configuration diagram showing a network surveillance unit according to a sixth embodiment of the present invention.

FIG. 6 is a block configuration diagram showing a network surveillance unit according to a sixth embodiment of the present invention. In addition to the configuration of the first or second embodiment, the surveillance unit comprises an alarm image storage unit 606 for storing alarm image.

An alarm management unit 607 requests a coded image storage unit 604 to store the alarm images and log information upon alarm generation or after elapsing a pre-designated constant time form the alarm generation.

The coded image storage unit 604 stores image information, which has been stored in the coded image storage unit 604 at the time of the request from the alarm management unit 607, in the alarm image storage unit 606.

A communication unit 605 is connected to a network 610, receives an alarm image reproduction request from the display terminals 611a to 611d, and transmitting the alarm image stored in the alarm image storage unit 606 according to the alarm image reproduction request, to the display terminals 611a to 611d.

As described above, the network surveillance unit can store the image after the alarm generation, and can reproduce the alarm image on the display terminals by transmitting the alarm image through the network according to the request from the display terminals.

Seventh Embodiment

Figure 7:
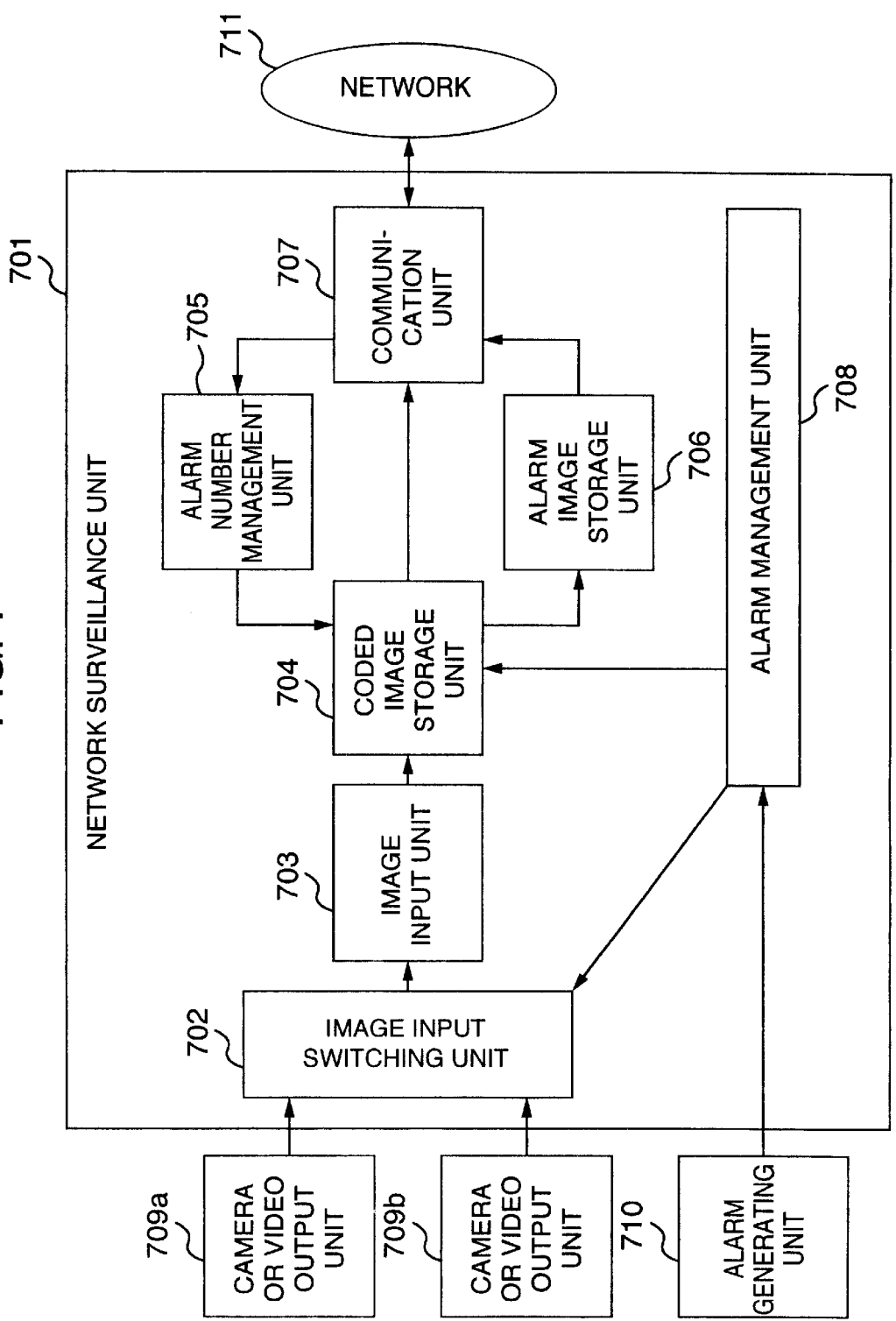
FIG. 7 is a block configuration diagram showing a network surveillance unit according to a seventh embodiment of the present invention.

FIG. 7 is a block configuration diagram showing a network surveillance unit according to a seventh embodiment of the present invention. In addition to the configuration of the sixth embodiment, the surveillance unit comprises an alarm number management unit 705.

The alarm number management unit 705 has stored therein at least two of information including the number, frame rate and storage time of alarm images which are stored in an alarm image storage unit 706 when the alarm is generated. A communication unit 707 is connected to a network 711, notifies the alarm number management unit 705 of the setting request for the information in the alarm number management unit 705 from a display terminal. The alarm number management unit 705 changes the information in the alarm number management unit 705 according to the setting request from the communication unit 707.

A coded image storage unit 704 stores the alarm images in series in the alarm image storage unit 706 according to the information in the alarm number management unit 705 at the alarm image storage request of the alarm management unit 708.

As described above, the network surveillance unit can store a series of image information after the alarm generation by arbitrarily setting the number of them, and can display the series of the alarm images on the display terminal through the network.

Eighth Embodiment

Figure 8:
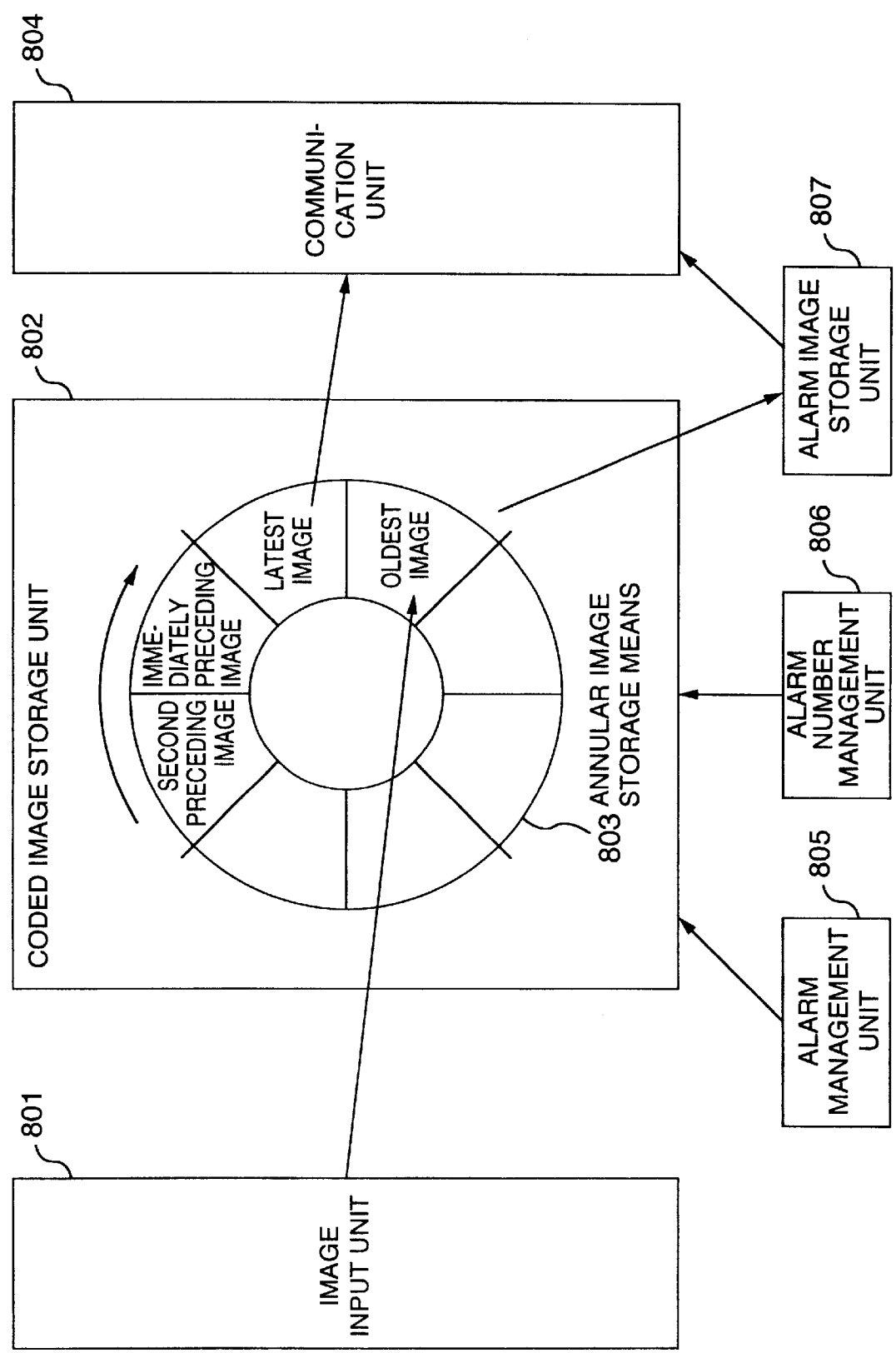
FIG. 8 is a block configuration diagram showing a network surveillance unit according to an eighth embodiment of the present invention.

FIG. 8 is a block diagram showing a configuration of a network surveillance unit according to an eighth embodiment of the invention. In addition to the configuration of the seventh embodiment, the surveillance unit comprises annular image storage means 803 in a coded image storage unit 802.

When the coded image storage unit 802 acquires the latest image from an image input unit 801, it overwrites the latest image on the oldest image storage area of the annular image storage means 803. By repeating this operation, a plurality of images are stored in the annular image storage means 803 including the past images up to the latest image in order.

In the case where the number of the alarm images stored before alarm generation is designated in an alarm number management unit 806, the coded image storage unit 802, upon receipt of an image storage request from the alarm management unit 805, stores the images in the number designated as counted from the latest image, in an alarm image storage unit 807.

Upon receipt of an alarm image acquiring request from a display terminal, a communication unit 804 retrieves the alarm image from the alarm image storage unit 807, and sends it to a network.

By the way, when the display terminal requests the acquisition of real-time images, the communication unit 804 retrieves the latest image from the annular image storage means 803 and sends it to the network.

As described above, the network surveillance unit 801 can store a series of image information before and after the alarm generation, and can display the alarm images before and after the alarm generation on the display terminal through the network.

Ninth Embodiment

Figure 9:
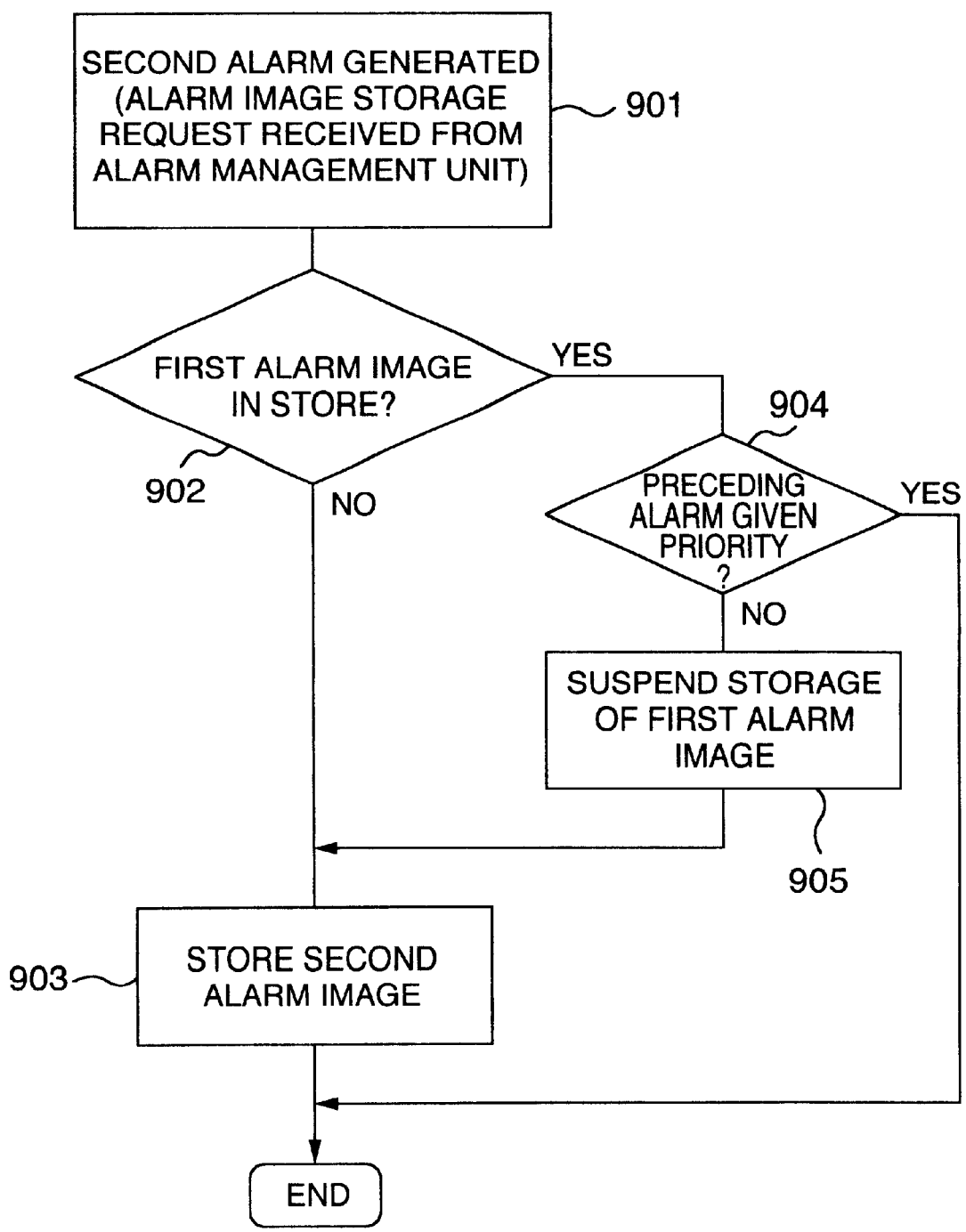
FIG. 9 is a block configuration diagram showing a network surveillance unit according to a ninth embodiment of the present invention.

FIG. 9 is a flowchart for the network surveillance unit according to a ninth embodiment of the present invention. In addition to the configuration of the seventh embodiment, a coded image storage unit includes means for determining the storage of a second alarm image upon generation of a second alarm while a first alarm image is being stored.

The coded image storage unit has two modes including a first-alarm-first-served mode and a last-alarm-first-served mode. One of these modes is set at a mode-setting request of a display terminal through a network.

In the case where the coded image storage unit receives a request for storing the second alarm image while the first alarm image is being stored in the first-alarm-first-served mode (steps 901 and 902), the coded image storage unit ignores the request for storing the second alarm image (step S904).

In the case where the coded image storage unit receives the request for storing the second alarm image while the first alarm image is being stored in the last-alarm-first-served mode (steps 901 and 902), the coded image storage unit suspends the process of storing the first alarm image (steps 904 and 905), and starts the process of storing the second alarm image (step 903).

By the way, the alarm management unit 708 stores the alarm information for all the alarms in any mode.

As described above, in the case where the alarms are generated continuously in a short time, the appropriate alarm image storing process can be realized meeting the application.

Tenth Embodiment

Figure 10:
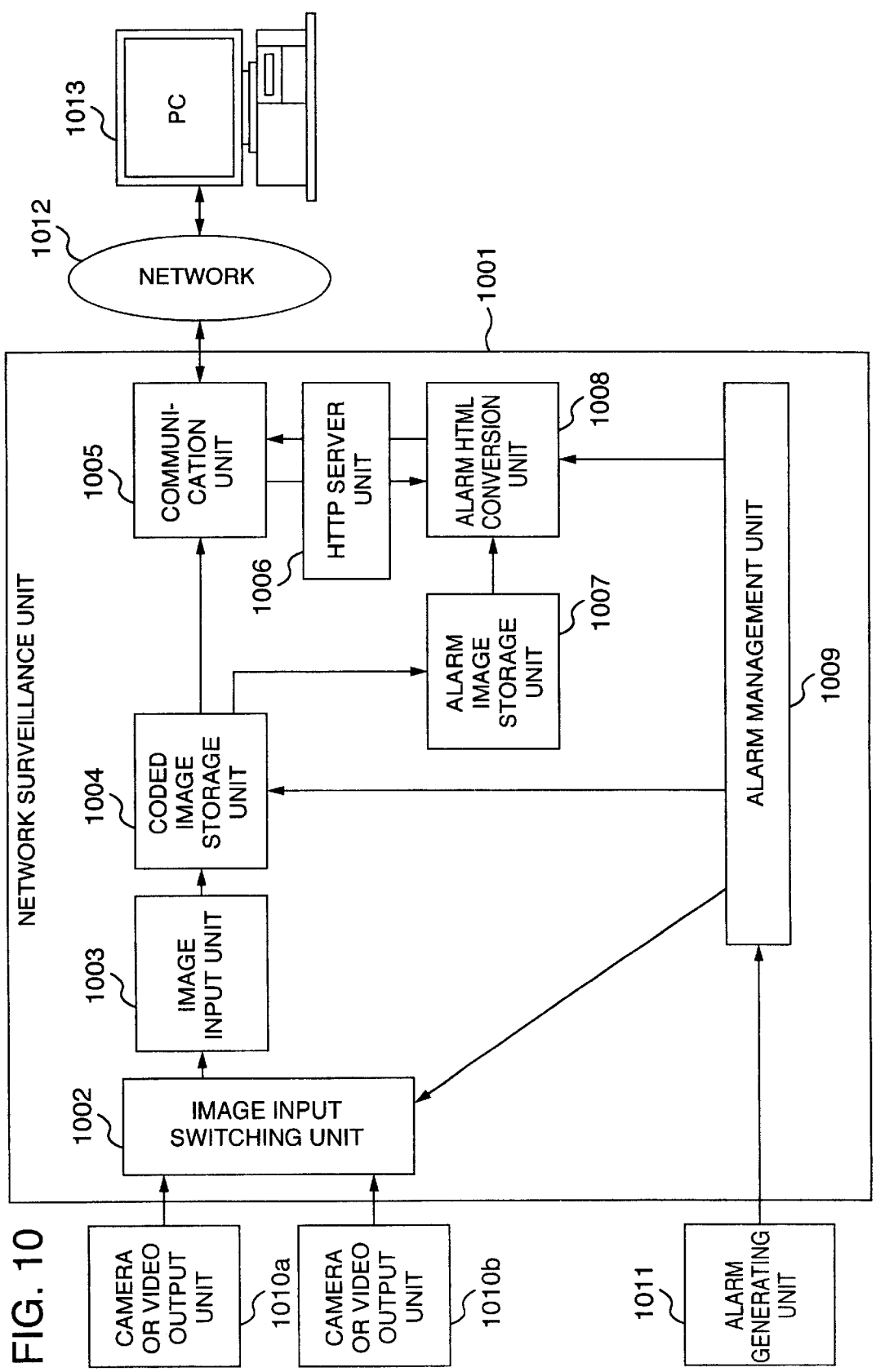
FIG. 10 is a block configuration diagram showing a network surveillance unit according to a tenth embodiment of the present invention.

FIG. 10 is a block diagram showing a network surveillance unit according to a tenth embodiment of the present invention. In addition to the configuration of the sixth or seventh embodiment, the network surveillance unit 1001 comprises an HTTP server 1006 and an alarm HTML conversion unit 1008.

A display terminal 1013 includes a WWW browsing software (WWW browser) as a user interface, and communicates with the network surveillance unit 1001 through the browser.

A communication unit 1005 is connected to a network 1012, receives a request in CGI format from the WWW browser of the display terminal 1013 through the network 1012, and delivers the request to the HTTP server unit 1006. The HTTP server unit 1006 interprets the request in CGI format, and requests the alarm HTML conversion unit 1008 to produce an alarm information list in alarm HTML format.

The alarm HTML conversion unit 1008 produces the alarm list in HTML format based on alarm log information stored in an alarm management unit 1009. By the way, in the case where the alarm images and log information corresponding to each alarm information exists in the alarm image storage unit 1007, the alarm list in HTML format can include the alarm images and log information itself or link information to the alarm image.

The HTTP server unit 1006 transmits the alarm list in HTML format produced by the alarm HTML conversion unit 1008, to a communication unit 1005. The communication unit 1005 transmits it to the display terminal 1013 through the network 1012.

As described above, the alarm information and the alarm images and log information held in the network surveillance unit can be displayed on the display terminal using the ordinary WWW browser.

Eleventh Embodiment

Figure 11:
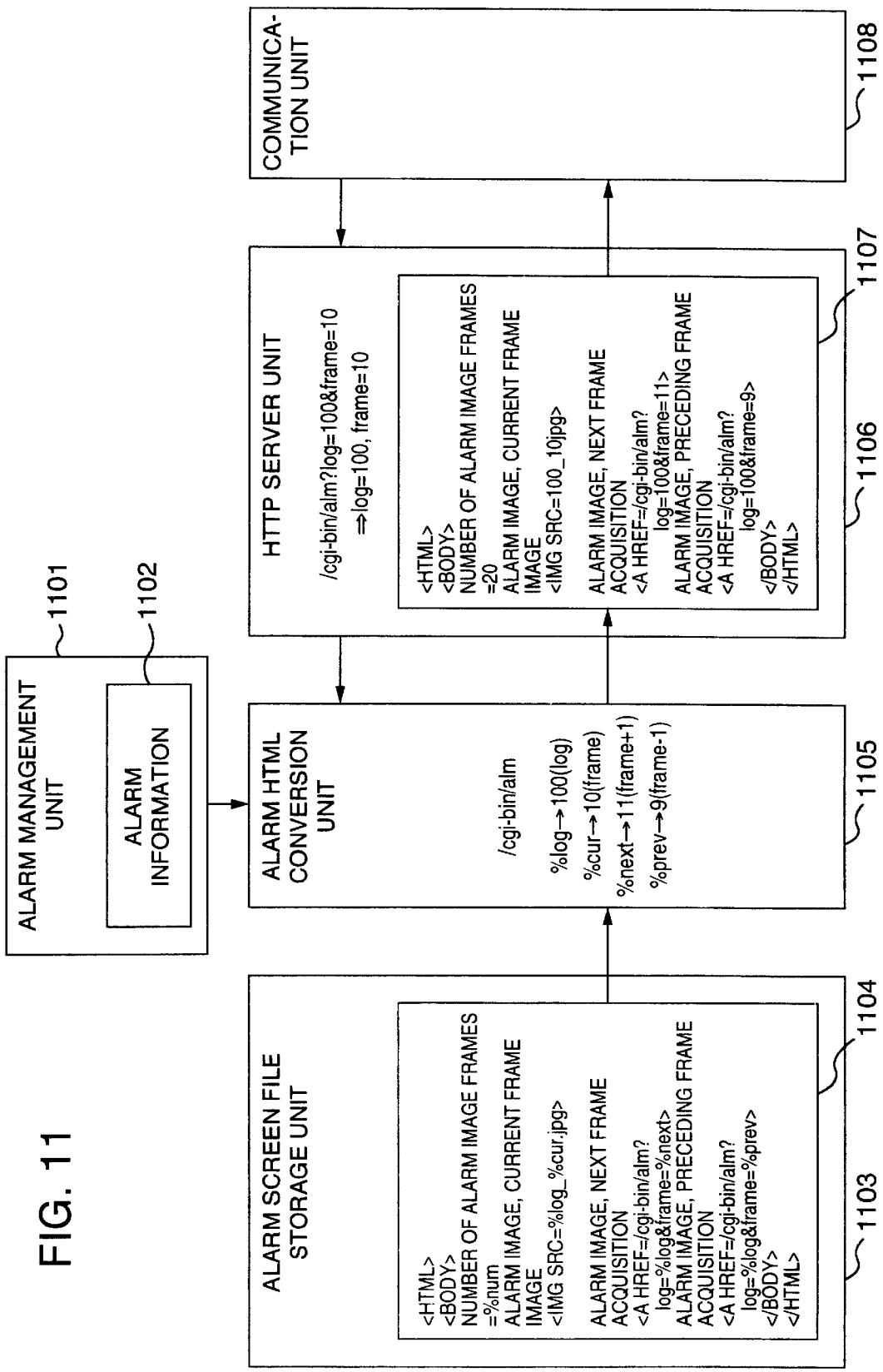
FIG. 11 is a block configuration diagram showing a network surveillance unit according to an 11th embodiment of the present invention.

FIG. 11 is a flowchart for a network surveillance unit according to an 11th embodiment of the present invention. In addition to the configuration according to the tenth embodiment, the surveillance unit comprises: an alarm screen file storage unit 1103 for storing an HTML file 1104 for alarm image display screen; and an alarm HTML conversion unit 1105.

A communication unit 1108 receives an alarm information display HTML file acquiring request from a display terminal through a network, and delivers it to the HTTP server unit 1006.

The HTTP server unit 1106 analyzes the acquiring request, acquires an alarm log number and an alarm screen number, and delivers them to the alarm HTML conversion unit 1005.

The alarm HTML conversion unit 1105 acquires the HTML file 1104 for alarm information display from the alarm request file storage unit 1103, and converting a specific character string in the HTML file 1104 into the alarm log number and the alarm screen number designated by the HTTP server 1006 to deliver them to the HTTP server 1106. Reference numeral 1107 designates the HTML file for alarm information display after conversion.

The HTTP server 1006 sends the HTML file 1107 for alarm information display after conversion to the communication unit 1108. The communication unit 1108 transmits the HTML file 1107 to the network.

In the process of the conversion in the alarm HTML conversion unit 1105, the number immediately after the designated alarm image number can be included in the HTML file by converting the specific character string described above into (the alarm image number designated by the HTTP server 1006+1), and the number immediately before the designated alarm image number can be included in the HTML file by converting the specific character string into (the alarm image number designated by the HTTP server 1006−1). In the embodiment shown in FIG. 11, upon acquisition of the HTML file by designating the alarm image number=10, for example, a link for acquiring the HTML file for displaying the alarm image numbers "9" and "11" is produced in the HTML file after conversion.

Tracing this link in the WWW browser of the display terminal, the HTML for alarm image display is displayed in the order of the image numbers "10", "11", "12" and so on, and the image numbers "10", "9", "8", and so on.

Also, the alarm HTML conversion unit 1105 acquires the alarm information 1102 including the number of alarm images for the log number designated by the HTTP server 1106 from the alarm management unit 1101, and can control the conversion of "the maximum value of the alarm image number+1" or "the minimum value of the alarm image number−1".

Further, in the case where The number of alarm images is equal to "n", assume that the value of the number % prev immediately before the image number=1 is "1", and the value of the number % next immediately following the image number=n is "n". Then, in the sequential image display operation of the WWW browser, the operation from "3"→"2"→"1"→"1" is realized in the forward direction of the image number, and the operation from "n-2"→"n-1"→"n"→"n" is realized in the rearward direction of the image number.

In similar fashion, in the case where the number of alarm images is equal to "m", assume that the value of the number % prev immediately before the image number=1 is "m", and the value of the number % next immediately following the image number=m is "1". Then, in the sequential image display operation of the WWW browser, the operation from "3"→"2"→"1"→"m"→"m-1"→ ... (loop) is realized in the forward direction of the image number, and the operation from "m-2"→"m-1"→"m"→"1"→"2"→ ... (loop) is realized in the rearward direction of the image number.

As described above, by providing the alarm HTML conversion unit, the reproduction and operation of the alarm image are facilitated with the WWW browser on the display terminal.

Twelfth Embodiment

Figure 12:
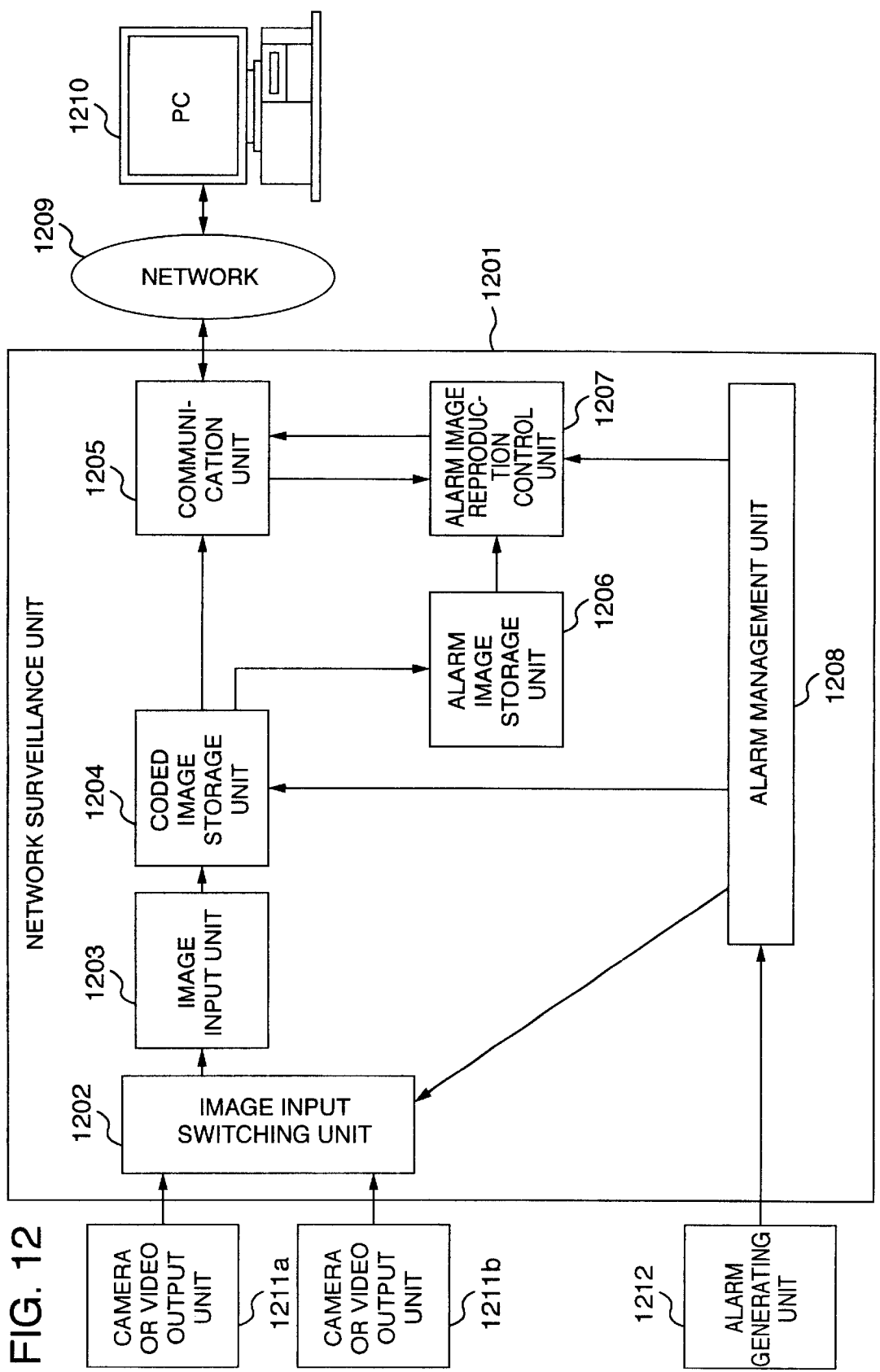
FIG. 12 is a block configuration diagram showing a network surveillance unit according to a 12th embodiment of the present invention.

FIG. 12 is a functional block diagram showing a 12th embodiment of the present invention. In addition to the configuration according to the sixth embodiment, a surveillance unit comprises an alarm image reproduction control unit 1207 for extracting an alarm image to be transmitted, from a series of alarm images stored in an alarm image storage unit 1206.

When an alarm is generated, an alarm management unit 1208 requests a coded image storage unit 1204 to store alarm images and log information. The coded image storage unit 1204 receives the request from the alarm management unit 1208, and stores an alarm image in the alarm image storage unit 1206.

The alarm image storage unit 1206 accumulates a series of alarm images in preparation for the generation of individual alarms.

An alarm image reproduction control unit 1207 extracts the optimum image from the series of alarm images for display at substantially a real-time rate on the screen of a display terminal according to a reproduction request from a display terminal 1210. The unit 1207 transmits the image to the display terminal 1210 through a communication unit 1205 and a network 1209. For example, as one of the optimum image extraction methods, there is a method in which an image to be transmitted is extracted from the alarm information including the number, storage time and frame rate of the alarm images stored with corresponding to the alarm images in the alarm image storage unit 1206, in accordance with the time intervals of the reproduction request from the display terminal 1210.

As described above, the network surveillance unit 1201 can display the alarm image in real time on the display terminal 1210 through the network 1209.

In the alarm image reproduction control unit 1207, the request commands of the normal reproduction, rapid feed, rewind, frame skip and slow reproduction can be interpreted. Then, the image transmitted from the series of alarm images accumulated in the alarm image storage unit 1206 is extracted in accordance with the time intervals of the request commands. Thereby, it is possible to control the special reproduction of the alarm images.

As described above, the network surveillance unit 1201 is capable of performing the special reproductions such as the rapid feed, rewind, frame skip and slow reproduction of the alarm images on the display terminal 1210 through the network 1209.

Thirteenth Embodiment

Figure 13:
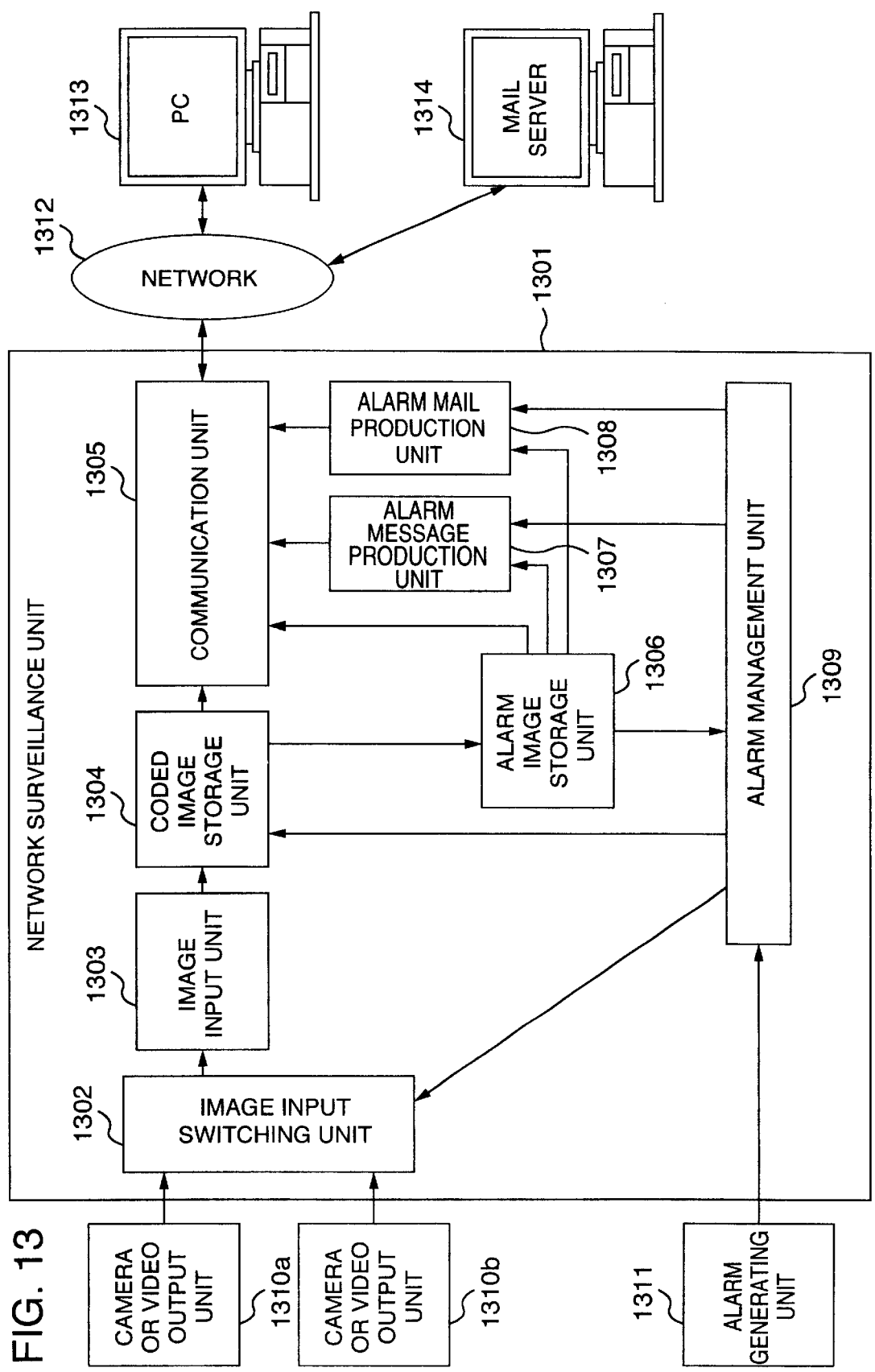
FIG. 13 is a block configuration diagram showing a network surveillance unit according to a 13th embodiment of the present invention.

FIG. 13 is a block diagram showing a network surveillance unit according to a 13th embodiment of the present invention. In addition to the configuration of the first or sixth embodiment, the surveillance unit comprises an alarm message production unit 1307 and/or an alarm mail production unit 1308.

In the case where there is the alarm message production unit 1307 and an alarm message is transmitted, the alarm management unit 1309 sends an alarm message production request to the alarm message production unit 1307 immediately or a predetermined time after receipt of an alarm from an alarm generating device 1311 or at the timing of the alarm image storage completion in an alarm image storage unit 1306. A display terminal 1313 activates message receiving means, and waits for the arrival of an alarm message. The alarm message production unit 1307 sends the alarm information in the alarm management unit 1309 directly to the display terminal 1313 through a communication unit 1305 and a network 1312.

As described above, the network surveillance unit 1301 can transmit the alarm information to the display terminal immediately after alarm generation.

In similar fashion, in the case where there is the alarm mail production unit 1308 and an alarm mail is transmitted, the alarm management unit 1309 sends an alarm mail production request to the alarm mail production unit 1307 immediately following or a predetermined after receipt of an alarm from the alarm generating device 1311 or at the timing of an alarm image storage completion in the alarm image storage unit 1306. The alarm mail production unit 1308 produces a mail of internet format from the alarm information in the alarm management unit 1309, and sends the alarm mail to a mail server 1314 through the communication unit 1305 and the network 1312.

Also, in the case where the alarm image storage unit 1306 contains the alarm images and log information, the alarm message or the alarm mail described above may include the address reference (link information) to the alarm image or the alarm image itself as attached data.

As described above, the network surveillance unit 1301 can transmit the alarm information to any devices capable of handling the internet mail such as the PC, the portable telephone, PDA or the pager through the internet upon alarm generation.

Fourteenth Embodiment

Figure 14:
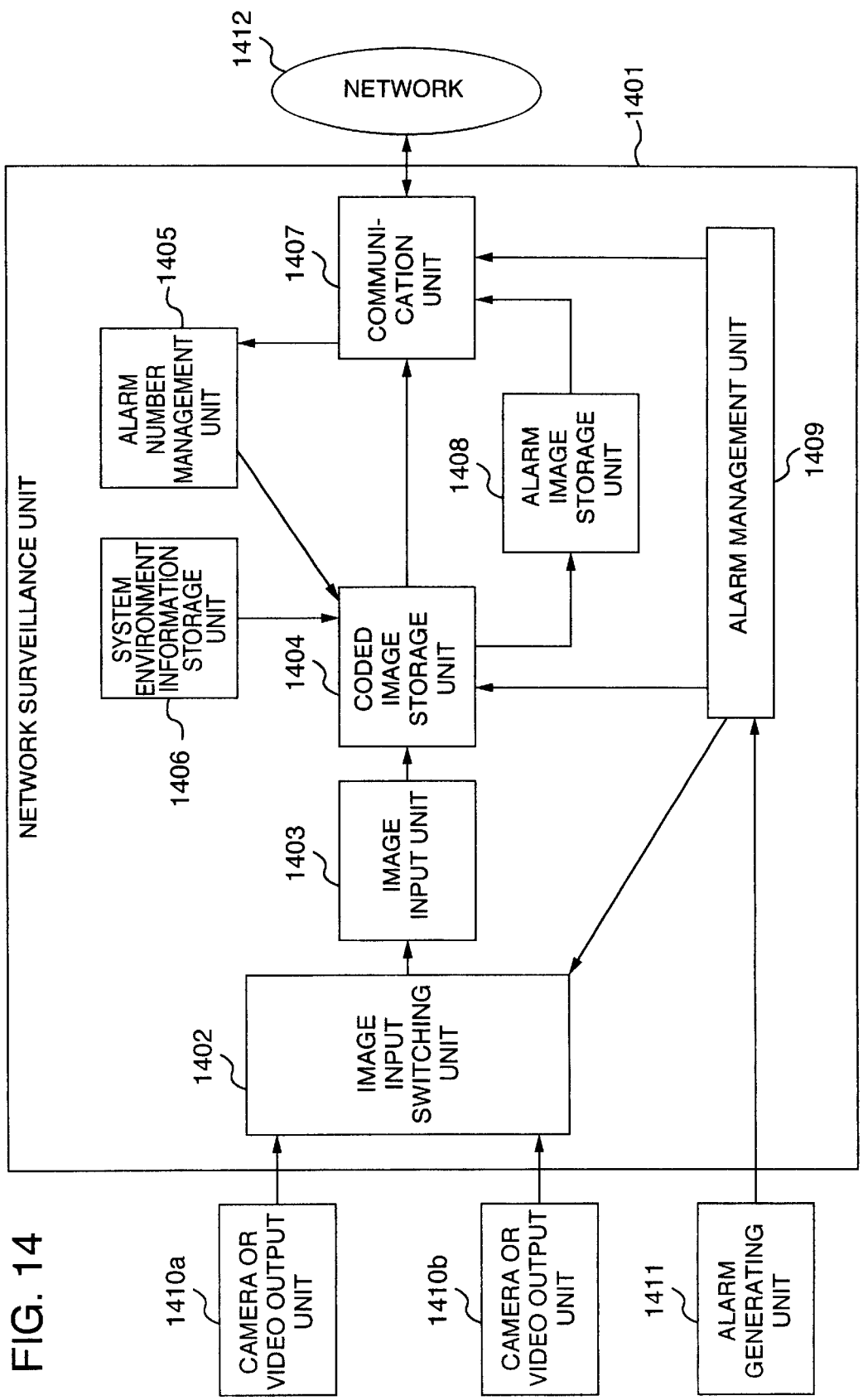
FIG. 14 is a block configuration diagram showing a network surveillance unit according to a 14th embodiment of the present invention.

FIG. 14 is a block diagram showing a network surveillance unit according to a fourteenth embodiment of the present invention. In addition to the configuration of the seventh embodiment, the surveillance unit comprises an apparatus environment information storage unit 1406.

The apparatus environment information storage unit 1406 includes a list of the total capacity of the alarm image storage area in the alarm image storage unit 1408 and the occupation capacity of the storage area per coded image for each quality setting thereof. The maximum number of alarm images capable of being stored in the alarm image storage unit The unit 1406 is calculated in accordance with the quality setting of the coded image by the formula (Total capacity of alarm image storage area)/(Occupation capacity of storage area per coded image).

The coded image storage unit 1404 compares (Maximum storage number calculated by the apparatus environment information storage unit 1406)—(Number stored in the alarm image storage unit 1408) with (Number of alarm images recorded upon generation of an alarm to be stored in the alarm number management unit 140), and with whichever is smaller as an upper limit, stores the alarm images in the alarm image storage unit 1408.

As described above, the alarm image can be stored with maximizing the use of the storage area of the network surveillance unit to a maximum.

Fifteenth Embodiment

Figure 15:
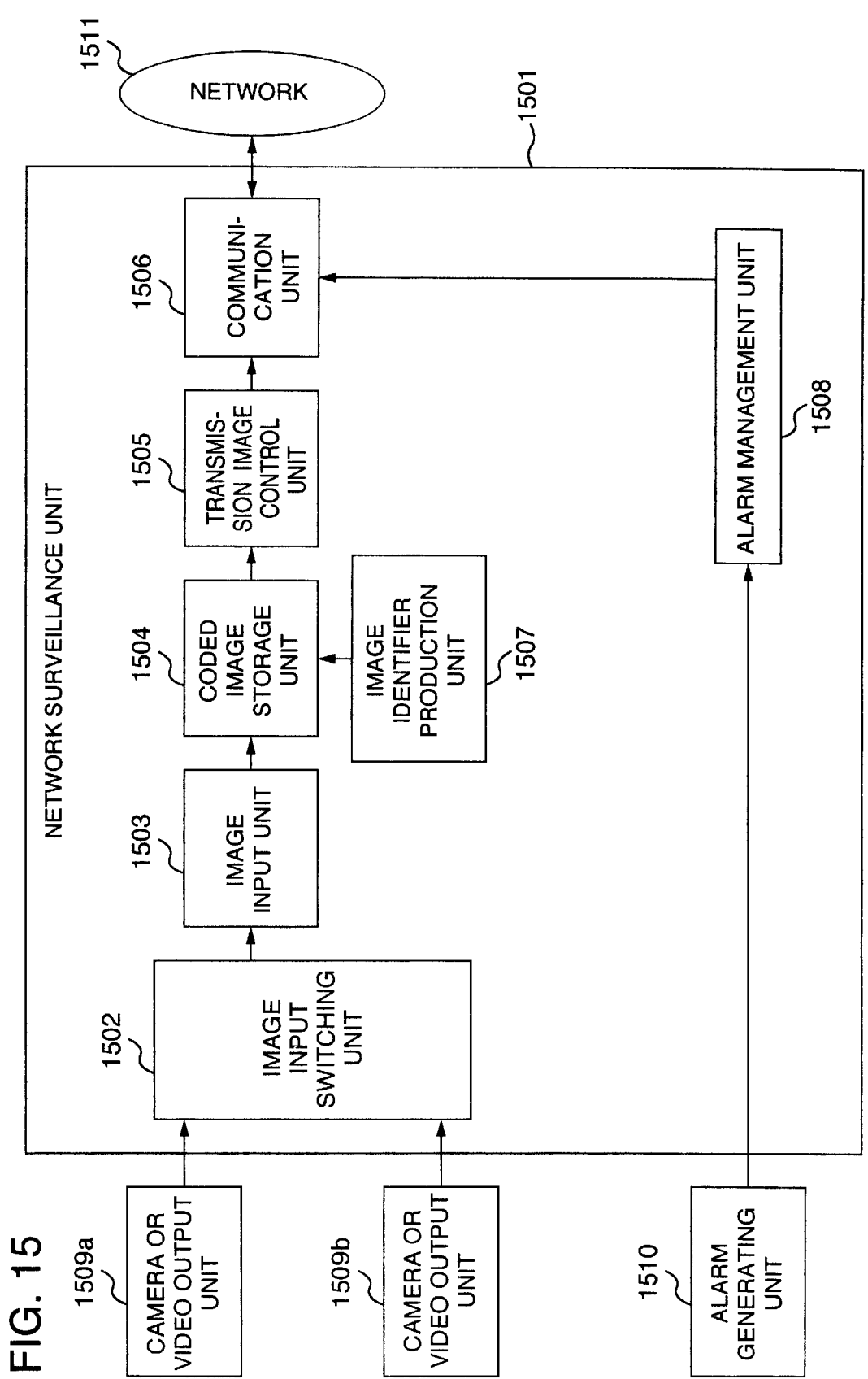
FIG. 15 is a block configuration diagram showing a network surveillance unit according to a 15th embodiment of the present invention.

FIG. 15 is a block diagram showing a network surveillance unit according to a 15th embodiment of the present invention. In addition to the configuration according to the first, second or third embodiment, the surveillance unit comprises an image identifier generating unit 1507 and a transmitted image control unit 1505.

The image identifier generating unit 1507 generates a unique identifier for a practically sufficient length of time according to a request of the coded image storage unit 1504.

The coded image storage unit 1504 stores the identifier generated by the image identifier generating unit 1507 as information attached to image information, each time one frame of the image information is acquired from an image input unit 1503.

Figure 16:
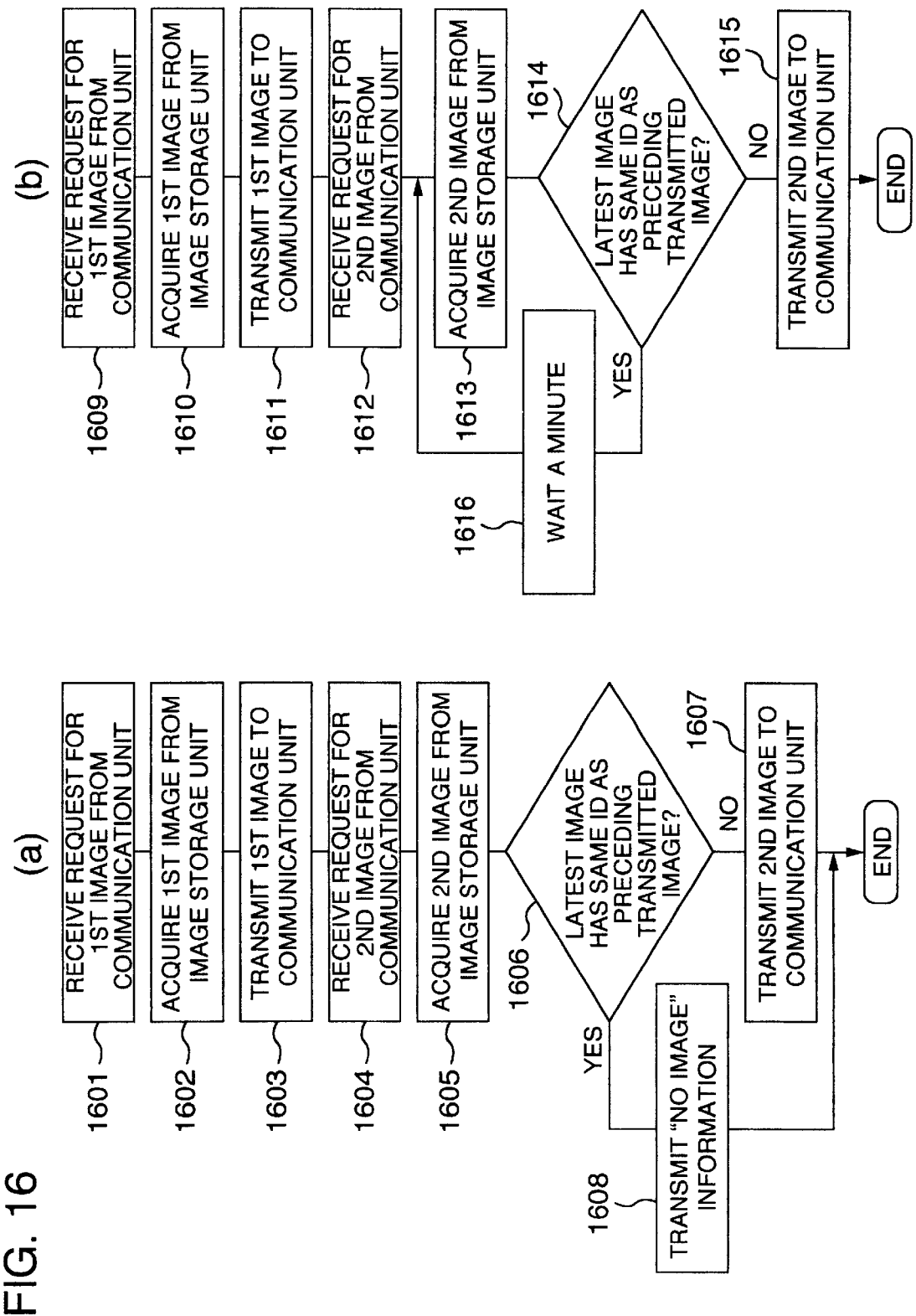
FIG. 16 is a flowchart showing the process performed by the transmission image control unit of the network surveillance unit according to the 15th embodiment of the present invention.

FIG. 16 is a flowchart describing the relation between the image identifier and the transmission scheme for transmitting an image from a transmission image control unit 1505 to a communication unit 1506. Two schemes (a) and (b) will be explained below with reference to FIG. 16.

Referring to FIG. 16(*a*), when the transmission image control unit 1505 receives a request for first image information from the communication unit 1506 (step 1601), it acquires the first image information from the coded image storage unit 1504 (step 1602) to send it to the communication unit 1506 (step 1603).

Upon receipt of a request for second image information from the communication unit 1506 (step 1604), the transmission image control unit 1505 acquires the second image information from the coded image storage unit 1504 (step 1605). In the process, if the identifier of the second image is different from the identifier of the first image (step 1606), the second image information is transmitted as it is to the communication unit 1506 (step 1607). In the case where the identifier of the second image is the same as that of the first image, information including contents "no latest image exists" is transmitted to the communication unit 1506 (step 1608).

Referring to FIG. 16(*b*), when the transmission image control unit 1505 receives the request for the first image information from the communication unit 1506 (step 1609), it acquires the first image information from the coded image storage unit 1504 (step 1610) to send it to the communication unit 1506 (step 1611).

Upon receipt of the request for the second image information from the communication unit 1506 (step 1612), the transmission image control unit 1505 acquires the second image information from the coded image storage unit 1504 (step 1613). In the process, in the case where the identifier of the second image is different from that of the first image (step 1614), the second image information is transmitted as it is to the communication unit 1506 as in the case of (a) (step 1615).

In the case where the identifier of the second image is the same as that of the first image, the process waits for a preset time (step 1616), and then the second image is acquired again from the coded image storage unit 1504 (step 1613). Until the acquisition of the image information having an identifier different from that of the first image, the process of steps 1613, 1614 and 1616 is repeated.

As described above, both the transmission load of the network for image transmission and the image display load for image reproduction on the terminal can be reduced.

Sixteenth Embodiment

Figure 17:
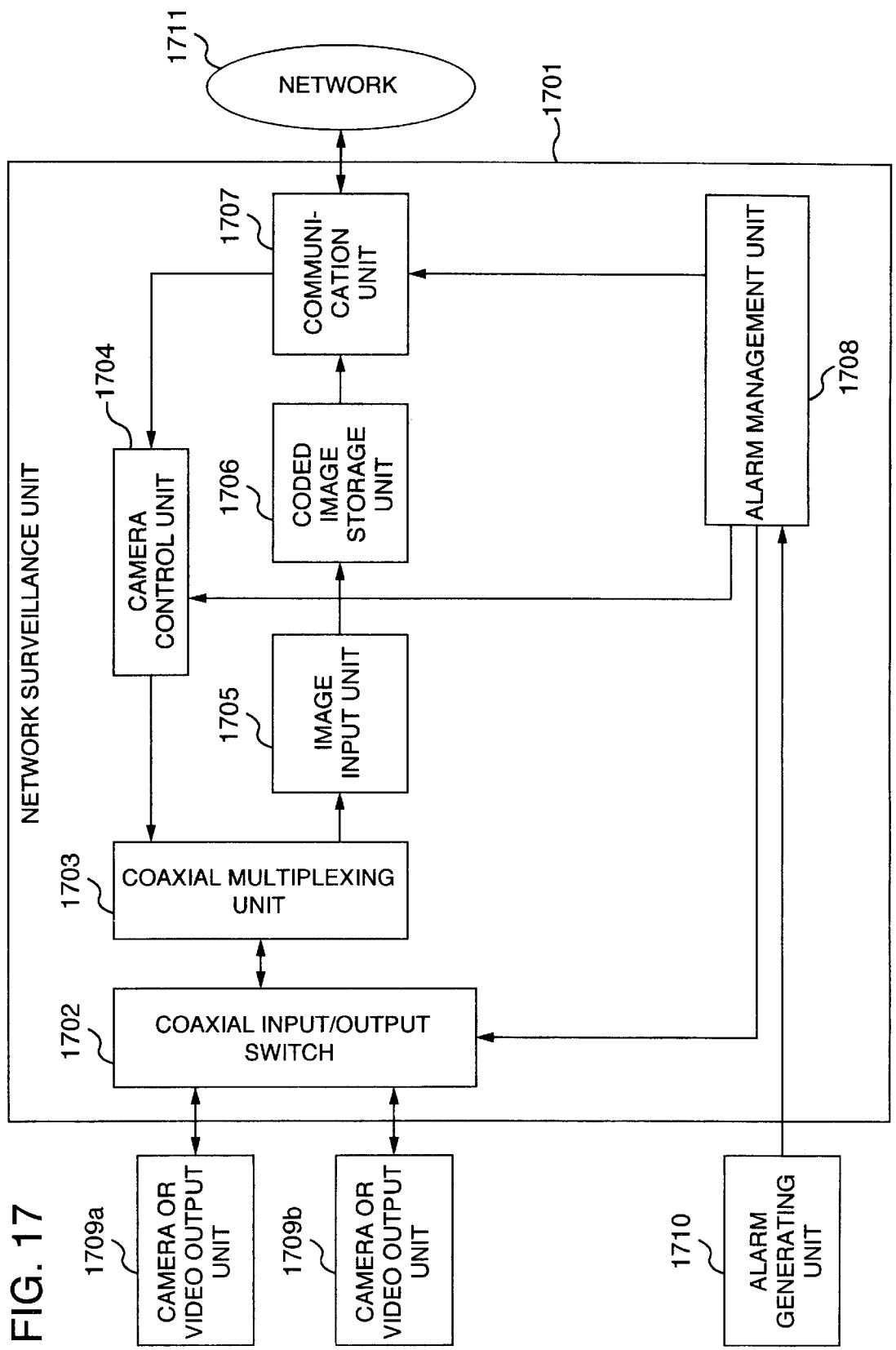
FIG. 17 is a block configuration diagram showing a network surveillance unit according to a 16th embodiment of the present invention.

FIG. 17 is a block diagram showing a network surveillance unit according to a 16th embodiment of the present invention. In addition to the configuration according to the first or second embodiment, the surveillance unit comprises a camera control unit 1704, a coaxial multiplexing unit 1703, and a coaxial input/output switching unit 1702 in place of the video input switching unit of the second embodiment.

In this embodiment, cameras or video output devices 1709*a* and 1709*b* are used in which the image output and the apparatus control input are multiplexed and implemented with the same coaxial cable.

In the coaxial multiplexing unit 1703, the camera control signal output from the camera control unit 1704 to the cameras or the video output devices 1709*a* and 1709*b* is multiplexed with the image input signal input to the image input unit 1705 from the cameras or the video output devices 1809*a* and 1809*b*.

The coaxial input/output switching unit 1702 switches the connection between a plurality of coaxial cables from the cameras or the video output devices 1709*a* and 1709*b* and the coaxial multiplexing unit 1703.

As described above, in a system using cameras or video output devices for realizing the control signal input and the image information output on the coaxial cable, the image can be transmitted and the video output device can be controlled through the network by a video coaxial cable alone.

Also, when the alarm management unit 1708 receives an alarm from the alarm generating device 1710, it switches the coaxial input/output switching unit 1702 to the set channel in accordance with the alarm operation setting, and transmits a camera control request to the camera control unit 1704.

As described above, the operation of the cameras or the video output devices operatively interlocked with the alarm control is realized upon alarm generation by the video coaxial cable alone.

Seventeenth Embodiment

Figure 18:
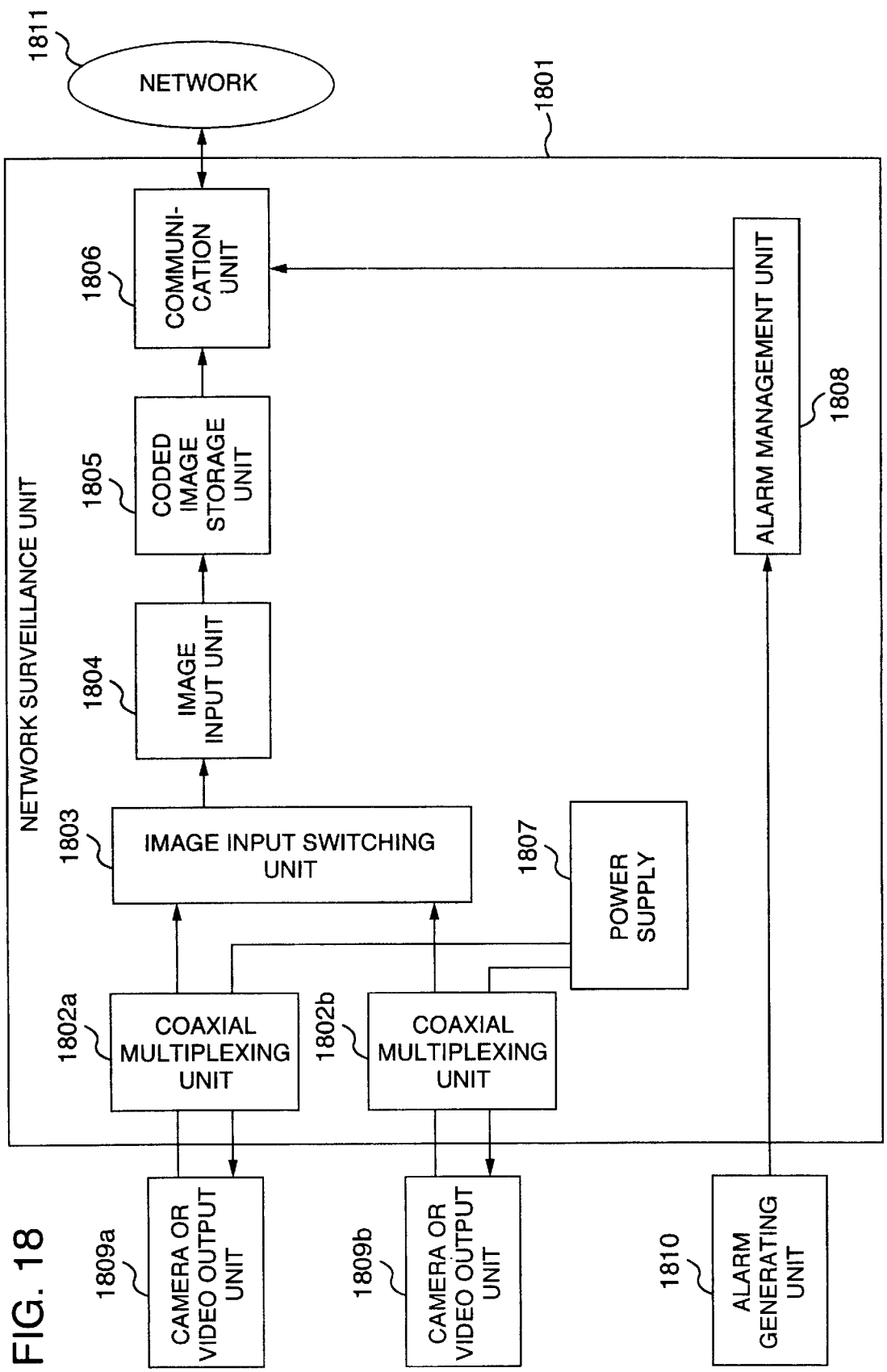
FIG. 18 is a block configuration diagram showing a network surveillance unit according to a 17th embodiment of the present invention.

FIG. 18 is a block diagram showing a network surveillance unit according to a 17th embodiment of the present invention. In addition to the configuration according to the first, second or third embodiment, the surveillance unit comprises coaxial multiplexing units 1802*a* and 1802*b*.

In this embodiment, cameras or video output devices 1809*a* and 1802*b* in which the image output and the power input are multiplexed and implemented with the same coaxial cable are used.

The coaxial multiplexing units 1802*a* and 1802*b* are connected to the cameras or the video output devices 1809*a* and 1809*b*, and multiplex on the coaxial cable the power which is sent from a power supply 1807 built in the network surveillance unit 1801 to the cameras or the video output devices 1809*a* and 1809*b*, and the image signals from the cameras or the video output devices 1809*a* and 1809*b*.

As described above, in the system using the cameras or the video output devices implementing the power supply and the image information output on the coaxial cable, the number of cables can be reduced.

Eighteenth Embodiment

Figure 19:
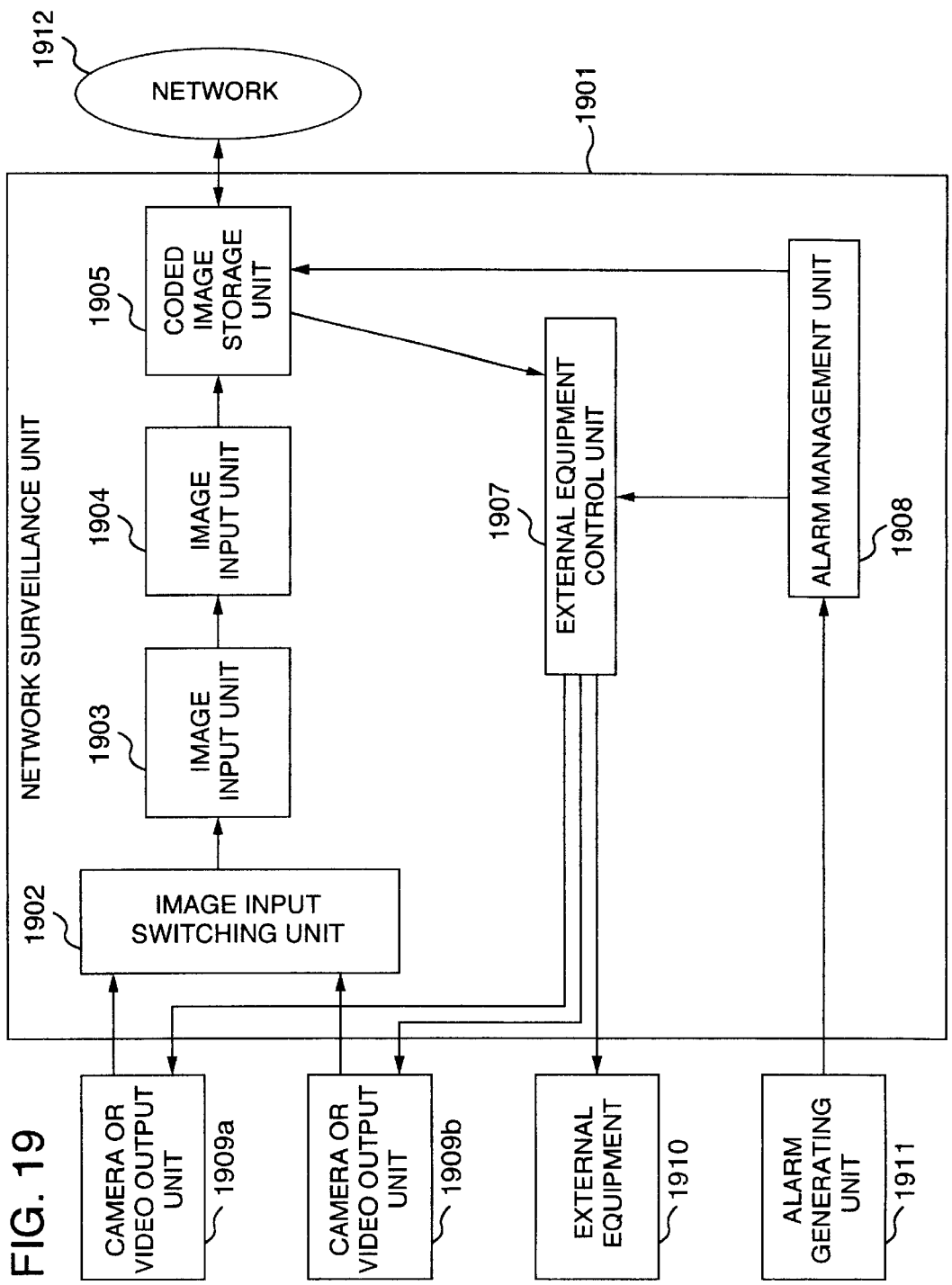
FIG. 19 is a block configuration diagram showing a network surveillance unit according to an 18th embodiment of the present invention.

FIG. 19 is a block diagram showing a network surveillance unit according to an 18th embodiment of the present invention. In addition to the configuration according to the first or second embodiment, the surveillance unit comprises an external equipment control unit 1907.

When a communication unit 1905 receives an external equipment control request from a display terminal through a network 1912, it requests the external equipment control unit 1907 to control external equipment.

Also, when an alarm management unit 1908 receives an alarm signal from an alarm generating device 1911, it requests the external equipment control unit 1907 to control the external equipment.

In any of the cases described above, the external equipment control unit 1907 transmits to each external equipment connected thereto a control signal corresponding to the type thereof.

Some examples of controlling the external equipment involve cameras or video output devices having a control input on other than a coaxial cable, the turning on/off of lighting equipment or opening/closing of an electric lock.

As described above, the network surveillance unit can control the external equipment upon alarm generation or by the operation from the display terminal through the network.

Nineteenth Embodiment

Figure 20:
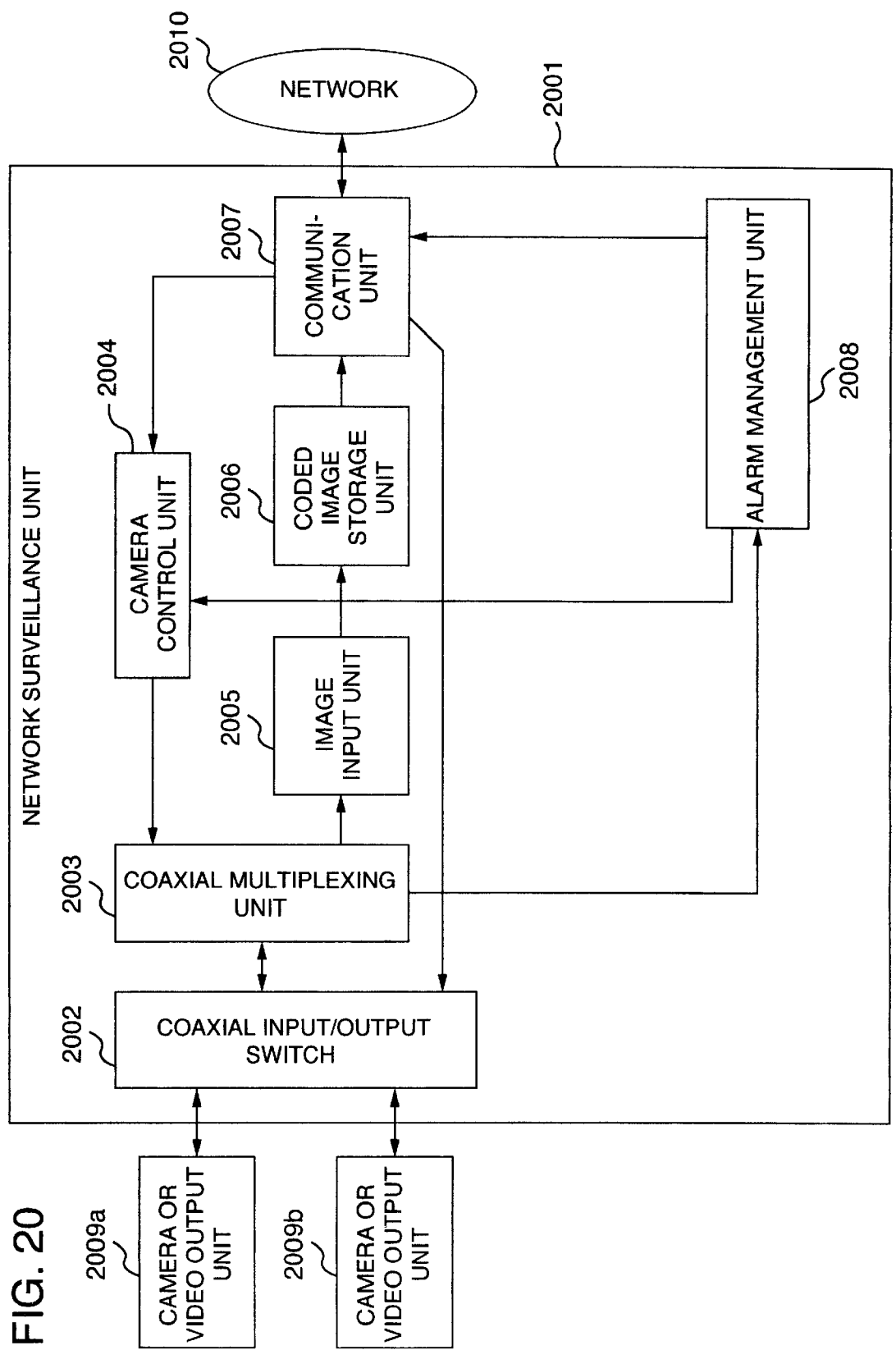
FIG. 20 is a block configuration diagram showing a network surveillance unit according to a 19th embodiment of the present invention.

FIG. 20 is a block diagram showing a network surveillance unit according to a 19th embodiment of the present invention. In addition to the configuration of the first or second embodiment, the surveillance unit comprises a camera control unit 2004, a coaxial multiplexing unit 2003, and a coaxial input/output switching unit 2002 in place of the video input switching unit of the second embodiment.

In this embodiment, cameras or video output devices 2009*a* and 2009*b* in which the image information output and alarm information output are multiplexed and implemented with the same coaxial cable are used. The coaxial multiplexing unit 2003 receives and demultiplexes the multiplexed information including the image information and alarm information from the cameras or the video output devices 2009*a* and 2009*b*. The image information is transmitted to an image input unit 2005, and the alarm information is transmitted to an alarm management unit 2008.

As described above, in the system using the cameras or the video output devices capable of multiplexing the alarm information and the image information output on the coaxial cable, the video transmission interlocked with the alarm can be realized through the video coaxial cable alone.

Further, the camera can be controlled by a camera alarm as an operation interlocked with an alarm, in the case where the cameras or the video output devices 2009*a* and 2009*b* include means for multiplexing the camera control signal input in addition to the image output and the alarm output, and the coaxial multiplexing unit 2003 includes means for multiplexing the camera control signal output in addition to the image input and the alarm input.

Twentieth Embodiment

Figure 21:
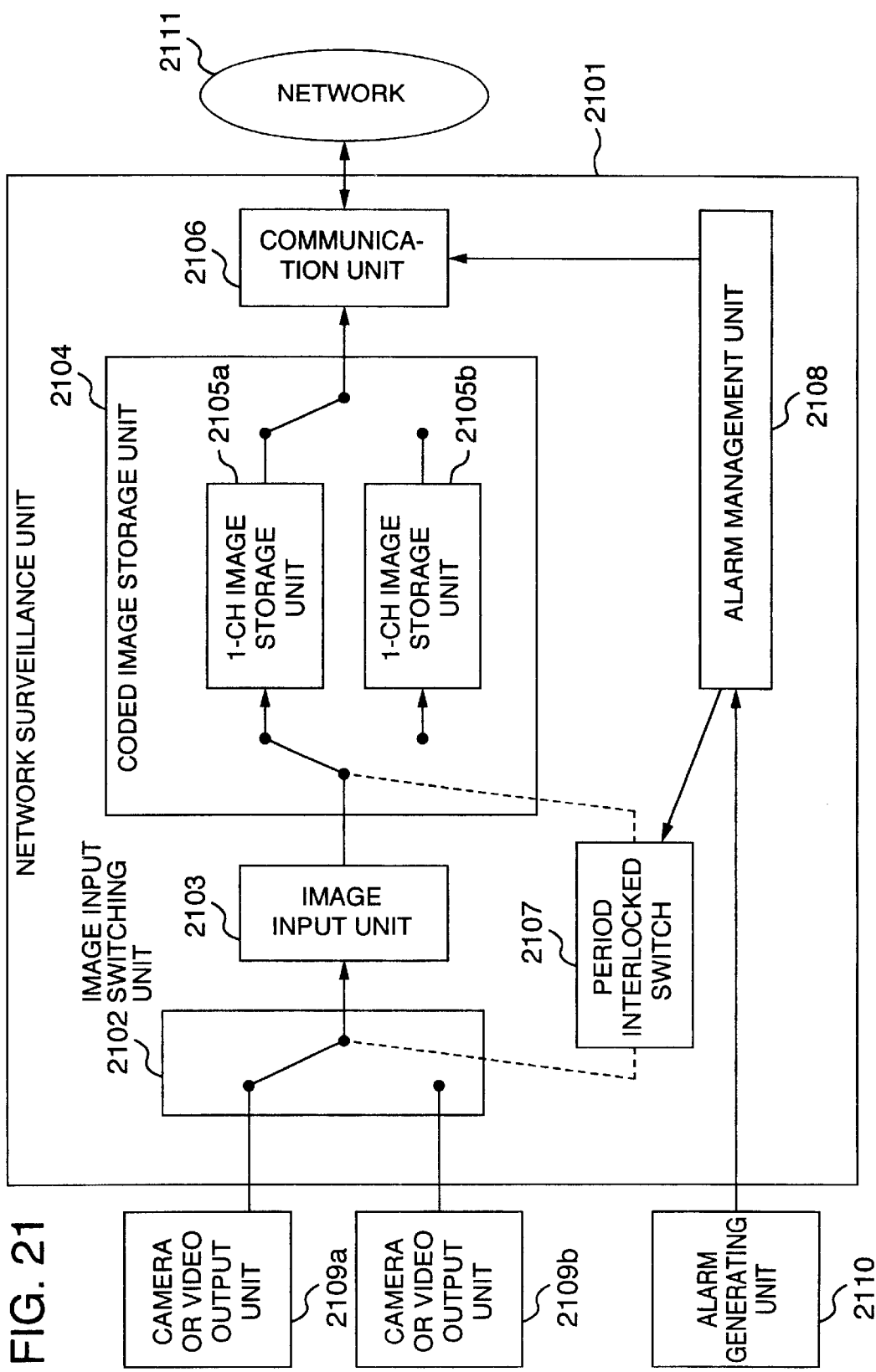
FIG. 21 is a block configuration diagram showing a network surveillance unit according to a 20th embodiment of the present invention.

FIG. 21 is a block diagram showing a network surveillance unit according to a 20th embodiment of the present invention. In addition to the configuration of the second or third embodiment, the surveillance unit comprises a coded image storage unit 2104 having image storage units 2105*a* and 2105*b* for each image input channel, and a period interlocked switching means 2107.

The period interlocked switching unit 2107 acquires image information in parallel from the cameras or the video output devices 2109*a* and 2109*b* in the steps described below.

First, the period interlocked switching unit 2107 switches an image input switching unit 2102 and one-channel image storage units 2105*a* and 2105*b* in a coded image storage unit 2105*a* to channel-1, respectively. An image input unit 2103 acquires one frame of image from the channel-1 unit 2109*a*, while an encoded image storage unit 2104 stores the particular one frame of image in the channel-1 image storage unit 2105*a*.

Then, the period interlocked switching unit 2107 switches the image input switching unit 2102 and the one-channel image storage units 2105*a* and 2105*b* in the coded image storage unit 2105*a* to channel-2, respectively. The image input unit 2103 acquires one frame of image from the channel-2 unit 2109*b*, while the coded image storage unit 2104 stores the particular one frame of image in the channel-2 image storage unit 2105*b*.

The operation described above is sequentially executed for connected channels. Once the operation is completed up to the last channel, the same process is repeated from channel-1 again.

As described above, even in the case where the network surveillance unit can accommodate fewer coding means than the video input channels, the latest images of the respective channels are stored in the one-channel image storage units 2105*a* and 2105*b* in the coded image storage unit 2105*a*, so that a plurality of display terminals can each realize the video display of an arbitrary channel for a reduced cost.

Twenty-first Embodiment

Figure 22:
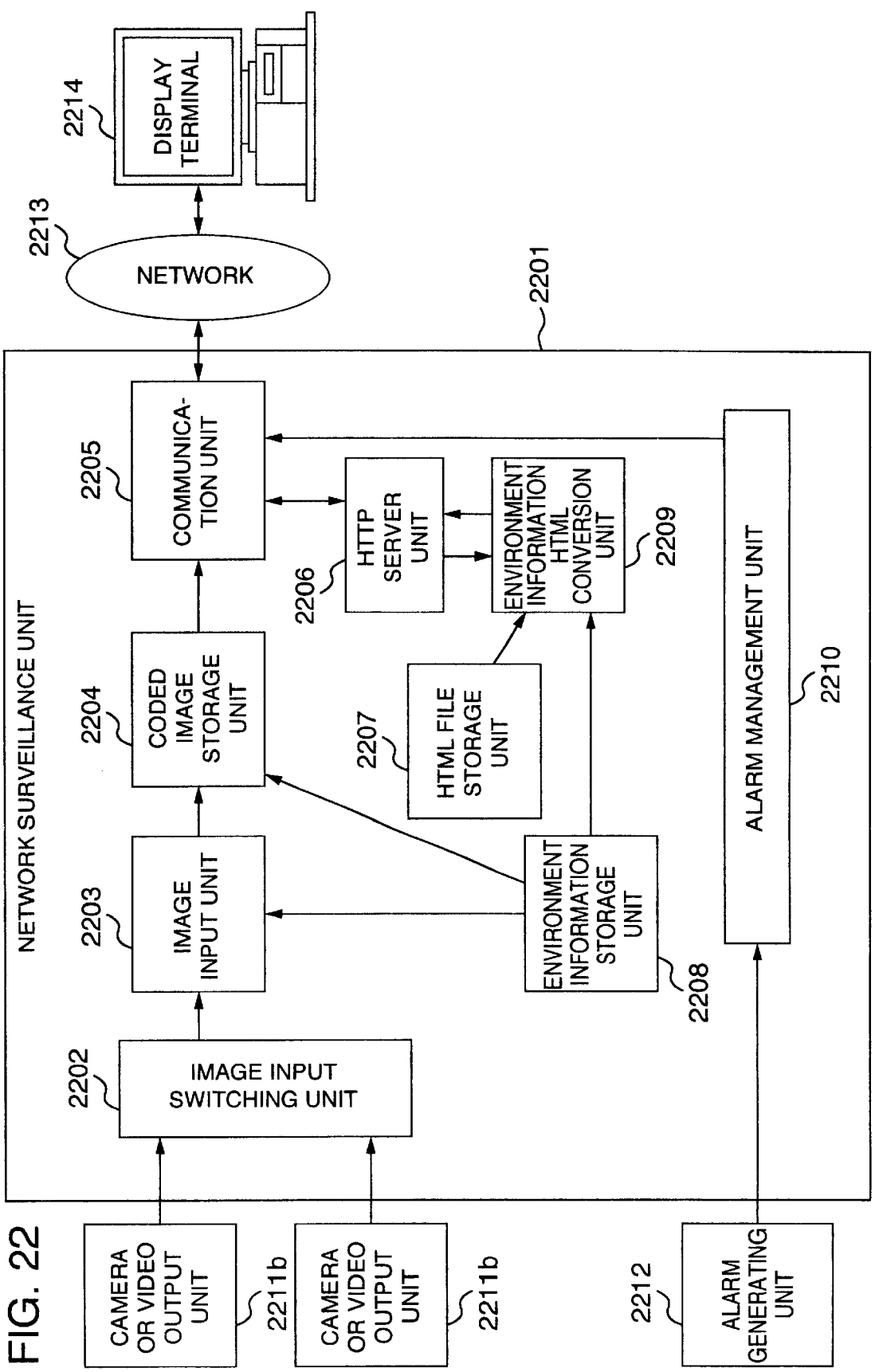
FIG. 22 is a block configuration diagram showing a network surveillance unit according to a 21st embodiment of the present invention.

FIG. 22 is a block diagram showing a network surveillance unit according to a 21st embodiment of the present invention. In addition to the configuration of the first or second embodiment, the surveillance unit comprises an HTTP server unit 2206, an HTML file storage unit 2207, an environment information storage unit 2208, and an environment information HTML conversion unit 2209.

The HTML file storage unit 2207 stores an HTML file describing the screen configuration of a display terminal 2214.

The environment information storage unit 2208 stores a setting value of the operating environment of each component of the network surveillance unit 2201. Some examples of the setting value are the size and coding parameters of the coded image, and the switching scheme of the image input channels explained with reference to the second and 20th embodiments.

The communication unit 2205 is connected to a network 2213, receives a file request from a WWW browser of the display terminal 2214 through a network 2213, and delivers it to the HTTP server unit 2206.

The HTTP server unit 2206 interprets the file request, and requests an HTML file for screen configuration of the display terminal 2214 from the environment information HTML conversion unit 2209.

The environment information HTML conversion unit 2209 converts a specific character string in the HTML file for the terminal screen configuration in the HTML file storage unit 2207 into an environment setting value to be stored in the environment information storage unit 2208, and sends it to the HTTP server 2206.

The HTTP server 2206 sends the HTML file to a communication unit 2205. The communication unit 2205 returns the HTML file to the display terminal 2214 through the network 2213.

Figure 23:
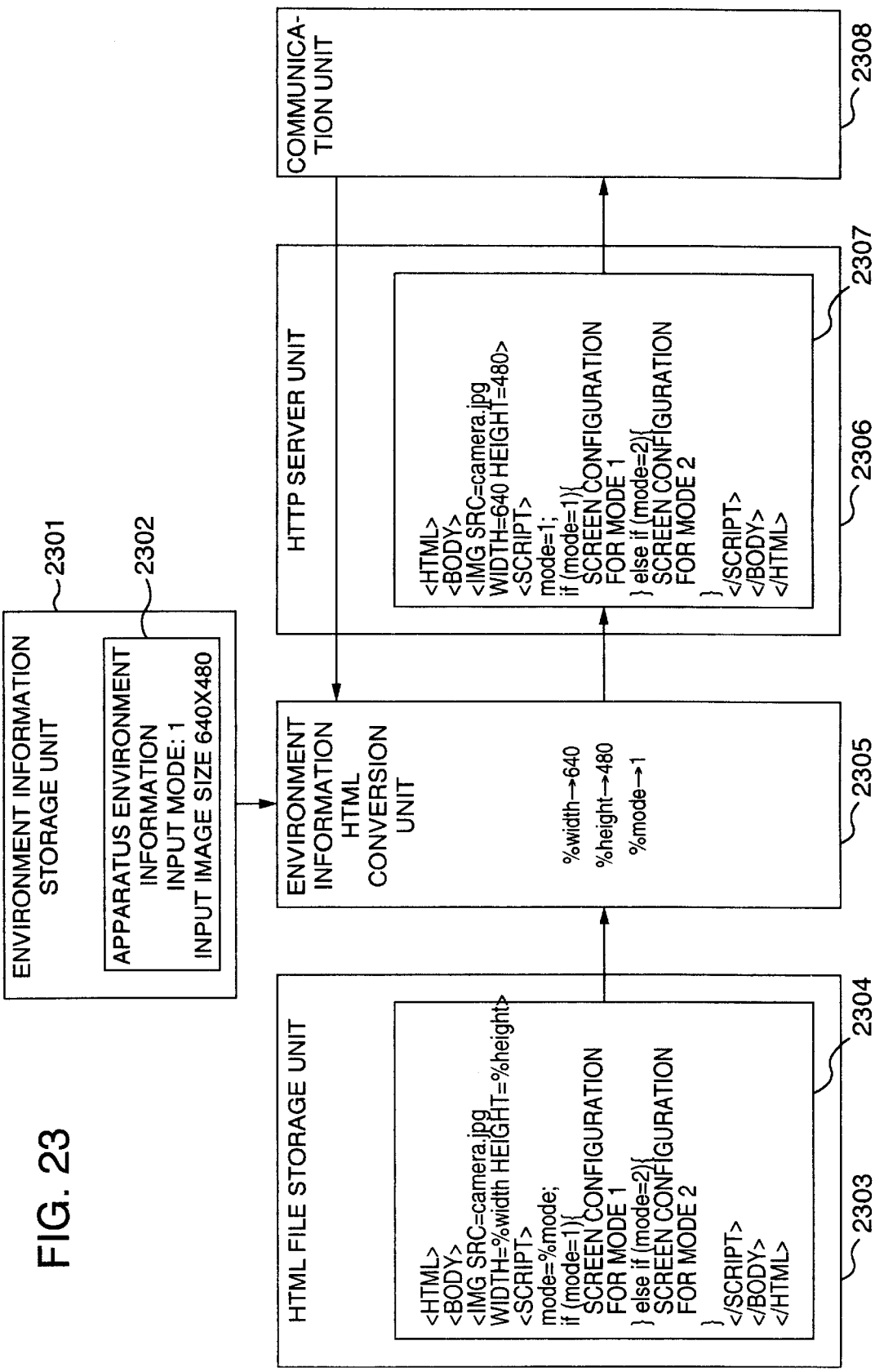
FIG. 23 is a block configuration diagram showing an HTML conversion process in the network surveillance unit according to the 21st embodiment of the present invention.

FIG. 23 is a block diagram showing the converting operation of the environment information HTML conversion unit 2209. The environment information HTML conversion unit 2209 includes an environment information storage unit 2301 having the apparatus environment information 2302, an HTML file storage unit 2303, an environment information HTML conversion unit 2305, an HTTP server 2306, and a communication unit 2308. The HTML file 2304 is the one before conversion stored in the HTML storage unit 2302, and the HTML file 2307 is the one after conversion by the environment information HTML conversion unit.

In FIG. 23, the HTML file 2304 has a JPEG file, which is indicated by width %width and height % height corresponding to the input image size, and the screen configuration corresponding to each mode is displayed by value % mode corresponding to the input mode.

The environment information HTML conversion unit 2305 converts character string % width, % height and % mode of the HTML file 2304 to numerical values "1", "640" and "480", respectively, in accordance with the value of the apparatus environment information 2302. The display terminal displays the JPEG file by width "640" and height "480" based on the HTML file 2307 after conversion, and displays the screen configuration corresponding to input mode "1".

As described above, the display terminal can operate the network surveillance unit with the screen configuration corresponding to the setting of the network surveillance unit.

Twenty-second Embodiment

Figure 24:
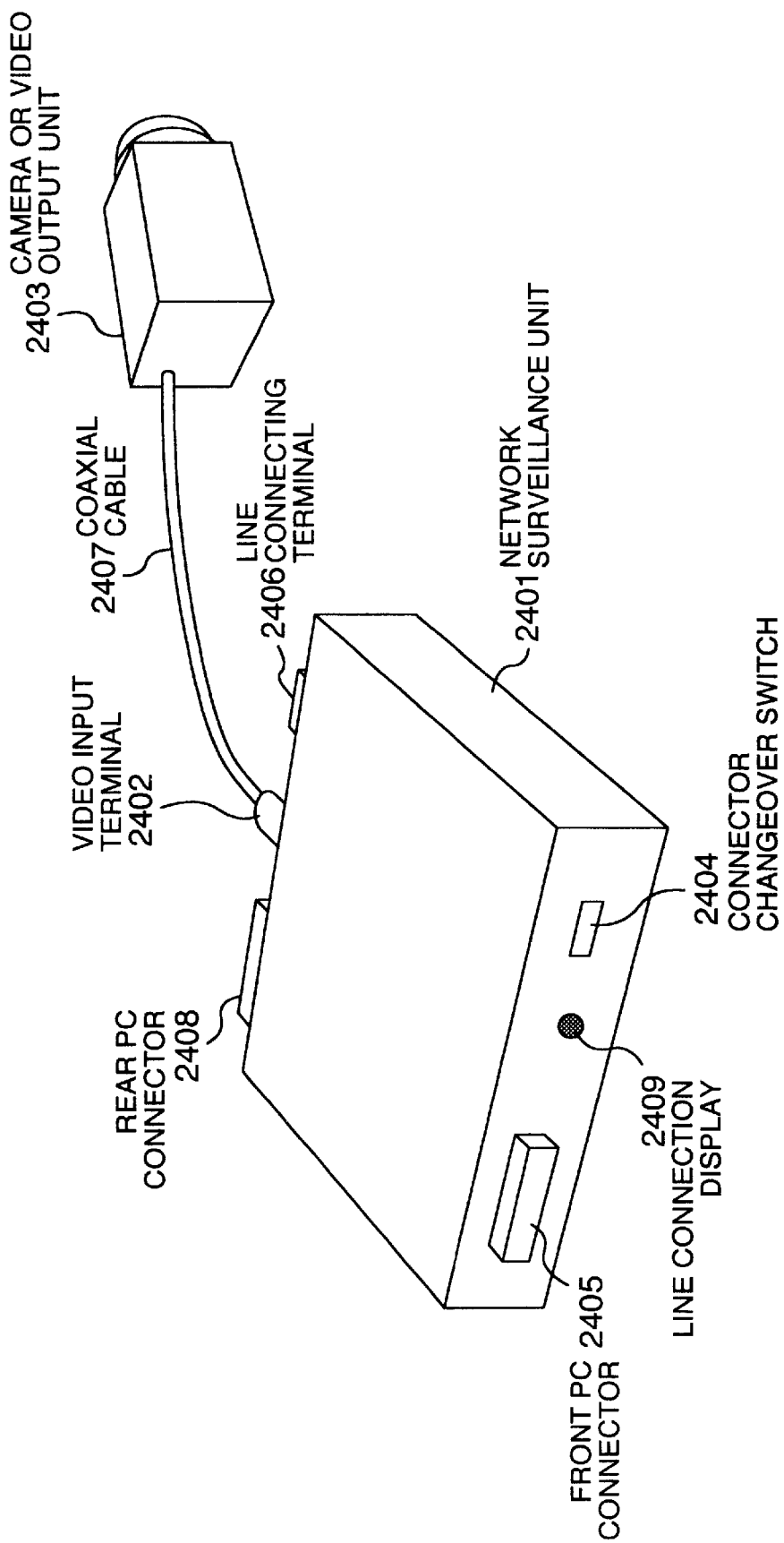
FIG. 24 is a perspective view showing the appearance of a network surveillance unit according to a 22nd embodiment of the present invention.

FIG. 24 is a perspective view showing a configuration example of a housing of a network surveillance unit according to the present invention. A network surveillance unit 2401 comprises: a video input terminal 2402 connected to a camera or a video output device 2403; a rear PC connector 2408 and a front PC connector 2405 both of which are connected to a PC or external equipment; a connector changeover switch 2404 for switching the rear PC connector 2408 and the front PC connector 2405; a line connecting terminal 2406 for connecting to a network line; and a line connection display unit 2409 for displaying the condition of communication with the network connected by the line connecting terminal 2406.

For simplification's sake, FIG. 24 shows the case including one video input terminal 2402, one line connecting terminal 2406 and one line connection display unit 2409. Nevertheless, it is easily estimated that each component part can be configured with a plurality of terminals.

The video input terminal 2402 is connected to the camera or the video output device 2403 by a coaxial cable 2407, is supplied with the image output from the camera or the video output device 2403, and inputs the image to the network surveillance unit 2402.

The rear PC connector 2408 enables the PC to be connected from the rear surface of the housing. The front PC connector 2405 enables the PC to be connected from the front portion of the housing. The rear and front surfaces are switched by the connector changeover switch 2404 which determines which is to be used the front or rear surface.

The configuration described above makes it possible to select the rear or front connector in accordance with the application. In the case where the network surveillance unit is built in a mount rack, for example, the external equipment kept connected uses the rear PC connector from the aesthetic viewpoint of cable wiring. For changing the setting information of the network surveillance unit 2401 mounted on the rack or the internal software thereof, the front PC connector is conveniently used for connection with the PC to eliminate the need of removing the network surveillance unit 2401 from the rack.

The line connecting terminal 2406 connects the network surveillance unit 2401 to the network to make possible communication including the image transmission to the display terminal and the receiving of a reproduction request. The line connection display unit 2409 displays the condition of the connection and communication with the network.

As described above, the surveillance unit 2401 of network type is connected to the network, and facilitates the visual observation of the connection and communication condition.

Twenty-third Embodiment

Figure 25:
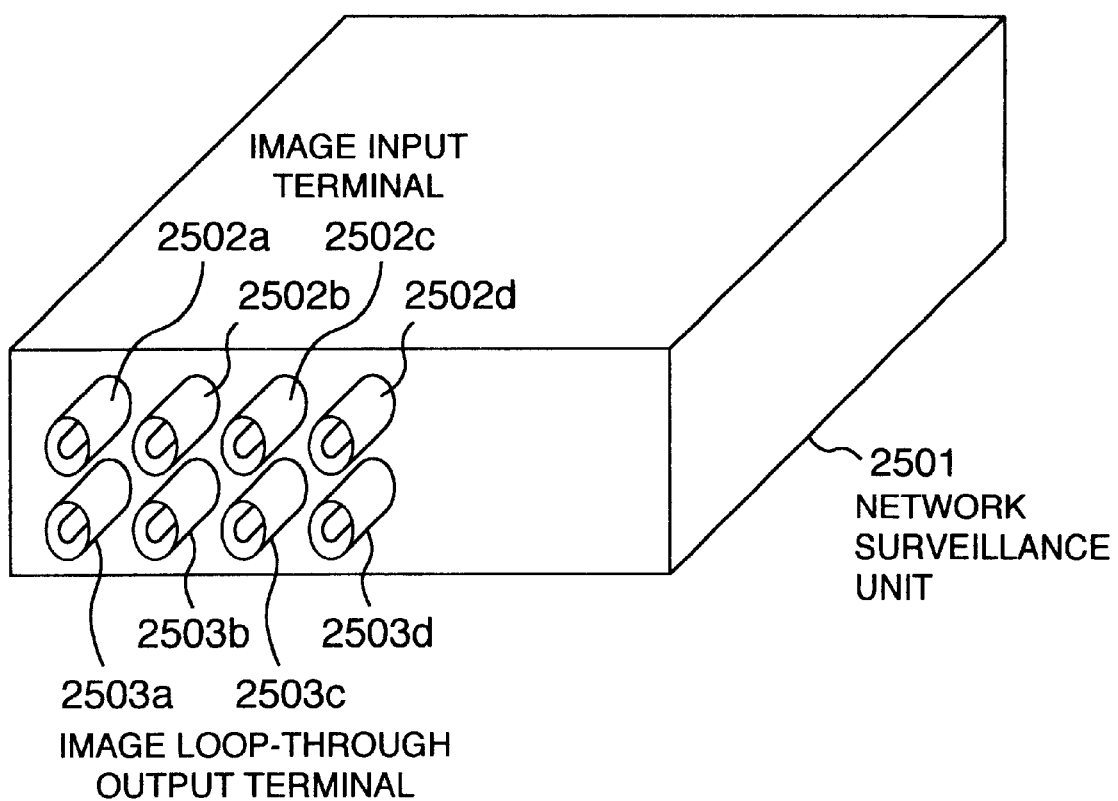
FIG. 25 is a perspective view showing the appearance of a network surveillance unit according to a 23rd embodiment of the present invention.

FIG. 25 is a perspective view showing a configuration example including image input/output terminals of a housing of a network surveillance unit according to the present invention.

A network surveillance unit 2501 comprises at least one image input terminal, and at least one image loop-through terminal.

FIG. 25 shows an example comprising 4-channel image input terminals 2502a to 2502d and 4-channel image loop-through terminals 2503a to 2503d. The loop-through terminals 2503a to 2503d are supplied with image information from the image input terminals 2502a to 2502d, respectively and output these signals without coding or otherwise processing.

Figure 26:
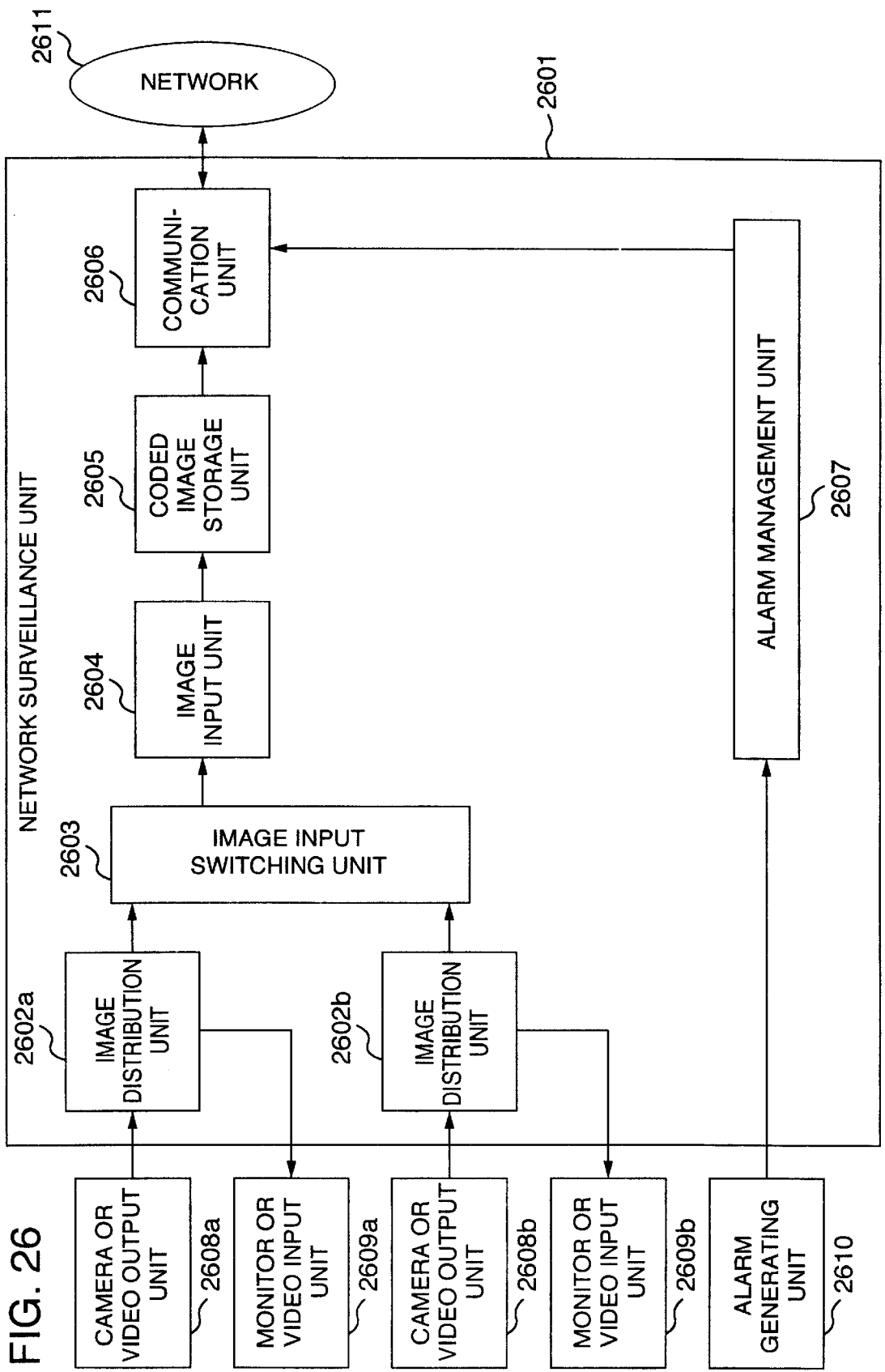
FIG. 26 is a block configuration diagram showing the network surveillance unit according to the 23rd embodiment of the present invention.

FIG. 26 is a block diagram showing a network surveillance unit according to this embodiment of the present invention. In addition to the configuration of the first or second embodiment, the surveillance unit comprises image distribution units 2602a and 2602b.

The image distribution units 2602a and 2602b are supplied with image information from corresponding cameras or video output devices 2608a and 2608b, respectively, and distributes the image information to output the image information to the monitors or video input units 2609a and 2609b and the image input switching unit 2603 corresponding to the image distributing units, respectively.

Figure 27:
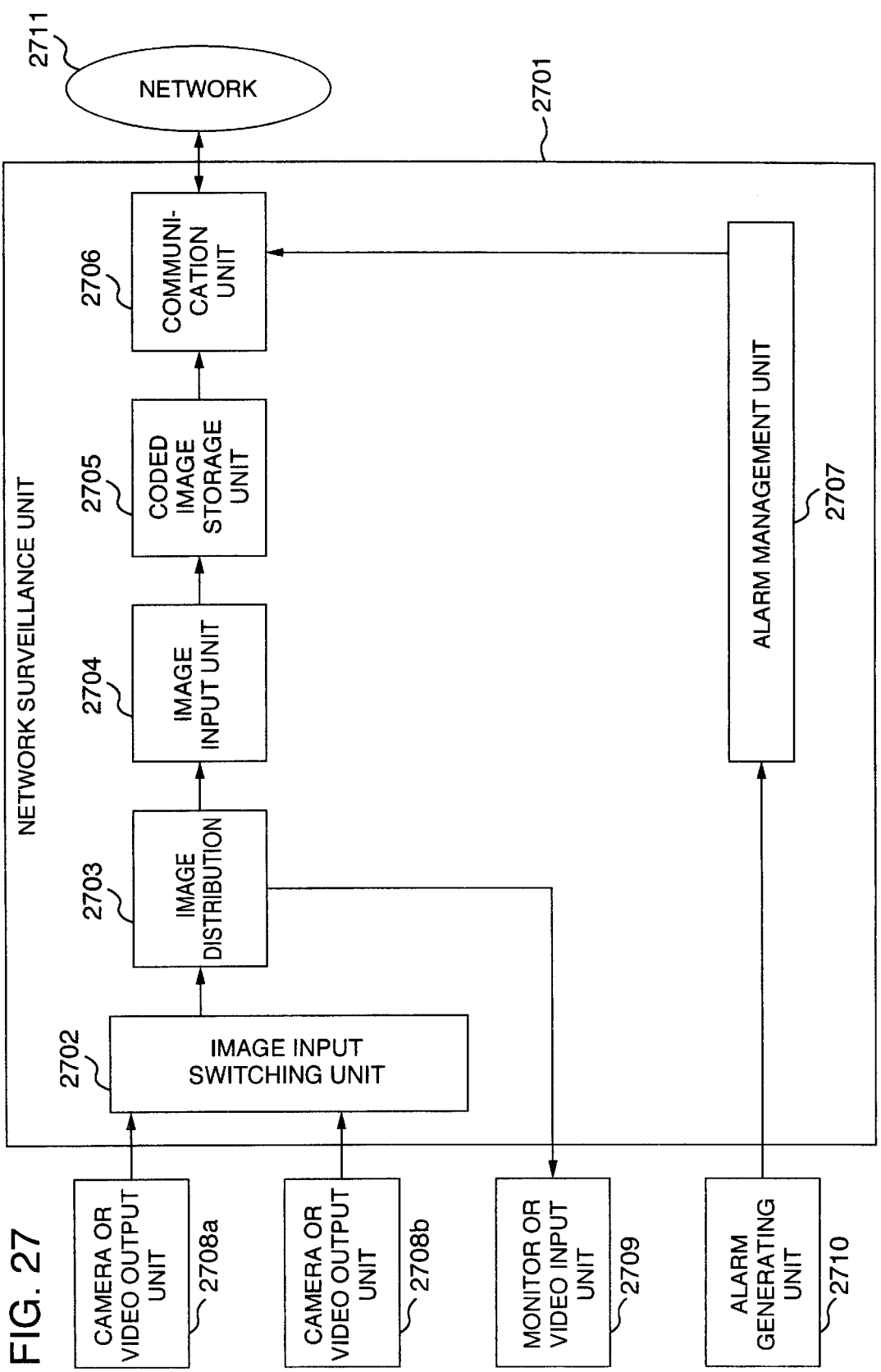
FIG. 27 is a block configuration diagram showing the network surveillance unit according to the 23rd embodiment of the invention.

FIG. 27 is a block diagram showing another embodiment of the present invention in which a plurality of images are input to the network surveillance unit. In addition to the configuration of the second embodiment, the surveillance unit comprises an image distribution unit 2703.

The image distribution unit 2703 is supplied with the image information from the image input switching unit 2702 for distributing the image information and outputting them to the monitor or the video input units 2709. In the case of the embodiment shown in FIG. 27, the image information of the channel selected by the image input switching unit 2702 is output to the monitor or video input unit 2709.

The configuration described above realizes the function of confirming the image output from the camera or the video output device by the monitor or transmitting the image output from the camera or the video output device to other devices.

Twenty-fourth Embodiment

Figure 28:
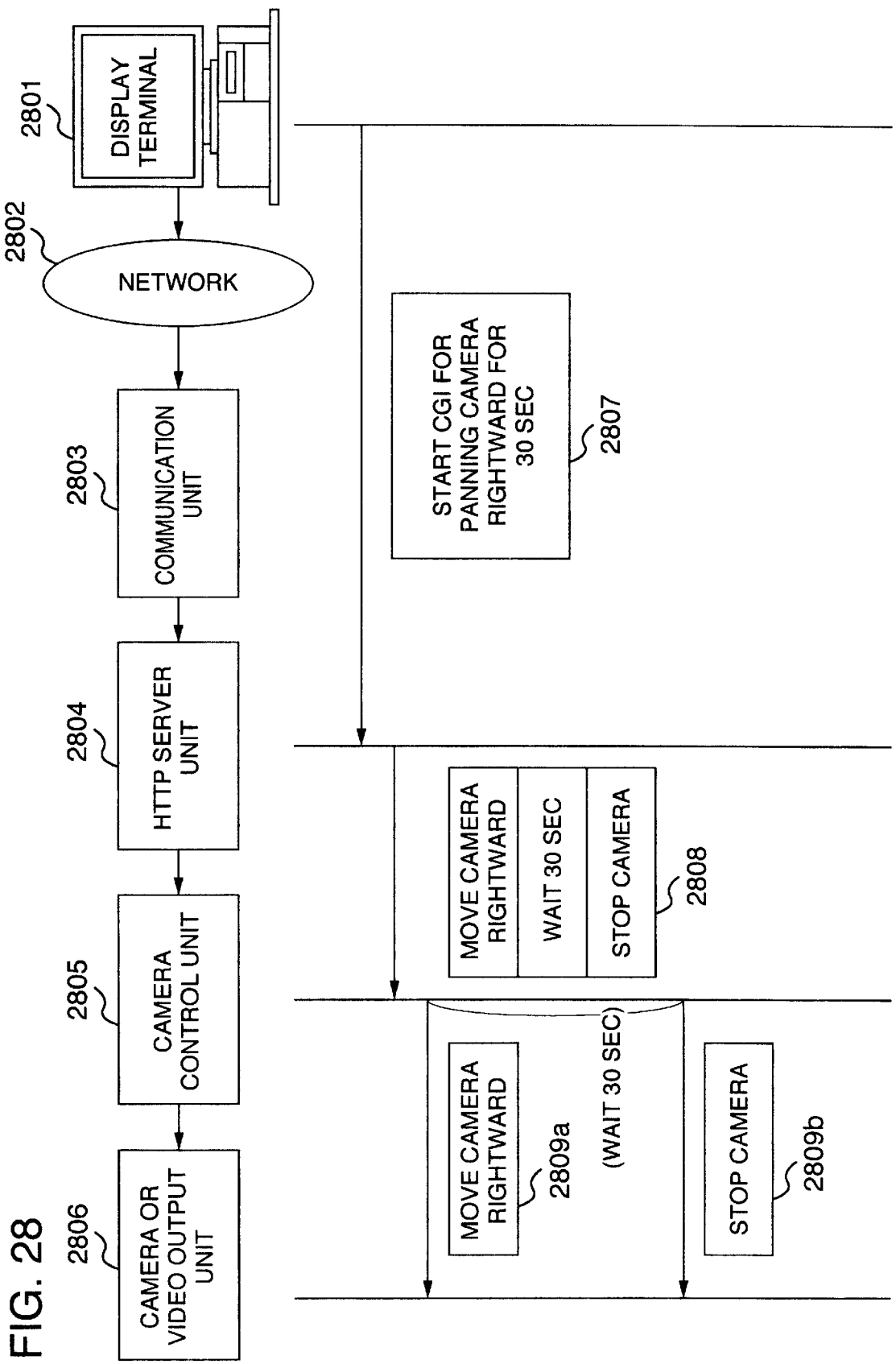
FIG. 28 is a block configuration diagram and a processing flowchart showing a network surveillance unit according to a 24th embodiment of the present invention.

FIG. 28 is a block diagram showing a network surveillance unit according to a 24th embodiment of the present invention. In addition to the configuration of the 16th or 18th embodiment, an HTTP server unit 2804 includes means for decomposing a single composite operating instruction 2807 from a display terminal 2801 into a chain 2808 of basic control instructions for a camera control unit 2805, and the camera control unit 2805 includes means for sending the chain 2808 of basic control instructions 2809*a* and 2809*b* sequentially to a camera or a video output device 2806.

A specific example of the embodiment will be explained with reference to FIG. 28. Assume that a button on the screen of the display terminal 2801 is assigned the function "to stop the camera after panning rightward for 30 seconds". When the terminal user depresses the button, the instruction 2807 to the effect that "stop the camera after panning rightward for 30 seconds" is sent to a communication unit 2803 through a network, and is decomposed into the chain 2808 of three instructions "move the camera rightward", "wait for 30 seconds" and "stop the camera" by the HTTP server unit. In compliance with the chain 2808 of the three instructions, the camera control unit 2805 first sends the instruction 2809 "move the camera rightward" to the camera 2806, and after waiting for 30 seconds, sends the instruction 2809*b* "stop the camera" to the camera 2806.

As described above, the camera or the video output device supplied with only basic control instructions can be controlled in the complicated fashion by the operation of the single button on the browser of the PC without being affected by the transmission delay through the network.

It will thus be understood from the foregoing description that according to the present invention, there is provided the network surveillance unit capable of realizing, in the single system, the image distribution from the camera and the security equipment such a switcher, and the recording the log of the information on alarm generation and the alarm information distribution from sensors and the security equipment.

What is claimed is:

1. A network surveillance unit comprising:
    an image input unit for being supplied with image information output from a video output device;
    a coded image storage unit for coding and accumulating the image information;
    an alarm management unit for detecting presence or absence of alarm generation from an alarm generating device, for storing alarm information, and for instructing the coded image storage unit to store an alarm image upon generation;
    a communication unit for receiving a request from a display terminal through a network, and for transmitting a coded image accumulated in the coded image storage unit or the alarm information accumulated in the alarm management unit according to the request.

2. A network surveillance unit in accordance with claim 1, characterized by comprising an image input switching unit connected to a plurality of video output devices and capable of switching to an arbitrary channel.

3. A network surveillance unit in accordance with claim 2, comprising:
    another communication unit for receiving a control instruction for a camera or a video output device from a terminal through the network;
    a camera control unit for interpreting the other communication unit, and for converting the other communication unit to a control instruction specific to the camera or the video output device;
    a coaxial multiplexing unit for multiplexing a control instruction output from the camera control unit on a coaxial cable and a video input from the camera or the video output device on the coaxial cable to perform input/output operation on the same coaxial cable; and
    a coaxial input/output switching unit for switching the control instruction output from the camera control unit and the video input by switching the connection of the coaxial cable for a plurality of channels.

4. A network surveillance unit in accordance with claim 2, comprising:
    a coaxial multiplexing unit for demultiplexing an alarm input and an image input which are multiplexed and transmitted from a camera or a video output device through a coaxial cable, a video signal being sent to the image input unit, and an alarm signal being sent to the alarm management unit; and
    a coaxial input/output switching unit for switching both the alarm input and the image input by switching a connection of a plurality of coaxial channels.

5. A network surveillance unit in accordance with claim 2, comprising:
    a coded image storage unit including an image storage unit corresponding to each of a plurality of image input channels;
    a period interlocked switching unit for instructing the corresponding channel to be switched periodically and sequentially each time a frame of image is input to the image input unit and the coded image storage unit; and
    a communication unit for acquiring an image of a channel designated by the display terminal from the image storage unit in the coded image storage unit, and for transmitting it to the network.

6. A network surveillance unit in accordance with claim 2, comprising:
    an environment information storage unit for setting an operating environment of the network surveillance unit;
    an HTML file storage unit for storing an HTML environment information for constructing a display terminal screen;
    an environment information HTML conversion unit for converting a specific character string in the HTML file into a setting of the operating environment; and
    an HTTP server unit for interpreting a request for the HTML file, and for transmitting the converted HTML file.

7. A network surveillance unit in accordance with claim 1 or 2, comprising a terminal-wise display format conversion unit for shaping the image information and the alarm information into a display format for browsing means (browser) on a personal computer.

8. A network surveillance unit in accordance with claim 1 or 2, comprising a terminal-wis display format conversion unit for shaping the image information and the alarm information into a display format for a world wide web browser adapted to be built in a television or a portable terminal connectable to an internet.

9. A network surveillance unit in accordance with claim 1, comprising:
   a plurality of image input units; and
   a multi-screen image synthesis unit for synthesizing the image information from the plurality of image input units into single image information.

10. A network surveillance unit in accordance with claim 1 or 2, comprising:
   an alarm management unit for instructing the coded image storage unit to store the alarm image upon alarm generation; and
   an alarm image storage unit for storing one image stored in the coded image storage unit as an alarm image in compliance with an instruction from the alarm management unit.

11. A network surveillance unit in accordance with claim 1 or 2, comprising:
   an alarm management unit for instructing the coded image storage unit to store the alarm image upon alarm generation; and
   an alarm image storage unit for storing a plurality of images stored in the coded image storage unit as a series of alarm images after receipt of an instruction from the alarm management unit.

12. A network surveillance unit in accordance with claim 11, comprising:
   an alarm number management and storage unit for storing two or more of information including a number, a storage time and a frame rate of the alarm images stored in the alarm image storage unit, wherein the coded image storage unit stores the alarm image in accordance with the information in the alarm number management and storage unit upon alarm generation.

13. A network surveillance unit in accordance with claim 10 or 11, wherein the coded image storage unit uses image storage means for always storing a past to the latest images to store, upon alarm generation, the past image as the alarm image before the alarm generation.

14. A network surveillance unit in accordance with claim 13, wherein the coded image storage unit uses image storage means for always storing past to latest images and to store, upon alarm generation, the past image as the alarm image before the alarm generation, and the coded image storage unit includes an alarm number management and storage unit for storing two or more of information including a number, a storage time and a frame rate of alarm images before alarm generation stored in the alarm image storage unit, and the coded image storage unit stores the alarm image in accordance with the information in the alarm number management and storage unit upon alarm generation.

15. A network surveillance unit in accordance with claim 11, wherein in a case where a second alarm is generated while an image of a first alarm is stored, the alarm management unit instructs the coded image unit to suspend an accumulation of the image of the first alarm and to store an image of the second alarm.

16. A network surveillance unit in accordance with claim 11, wherein in a case where a second alarm is generated while an image of a first alarm is stored, the alarm management unit instructs the coded image unit to store only generation information of the second alarm but not to store an image of the second alarm.

17. A network surveillance unit in accordance with claim 12 or 14, comprising:
   an apparatus environment information storage unit for storing a list of an image data occupancy rate due to a storage capacity of the alarm image storage unit and a size and quality of the image information; and
   an alarm number management and storage unit for calculating a maximum number of alarm images stored in the alarm image storage unit in setting a current environment of the network surveillance unit based on information of the apparatus environment information storage unit, and for limiting the number of the stored alarm images to the maximum number of stored alarm images.

18. A network surveillance unit in accordance with claim 10, further comprising an alarm image reproduction control unit for controlling a reproduction of the alarm image by extracting an image transmitted from a series of alarm images accumulated in the alarm image storage unit in accordance with a receiving interval of the requests for the latest image transmitted from the display terminal, wherein the alarm image is displayed in real time on the display terminal.

19. A network surveillance unit in accordance with claim 10, further comprising an alarm image reproduction control unit for controlling a special reproduction of an alarm image by extracting an image transmitted from a series of alarm images accumulated in the alarm image storage unit in accordance with a request command received by communication with the display terminal and a receiving interval of the request command, wherein the special reproduction such as a rapid feed, a rewind, a frame skip and slow reproduction are effected on the display terminal.

20. A network surveillance unit in accordance with claim 1, 2 or 10, comprising:
   a communication unit for receiving a request for an alarm list from the display terminal;
   an alarm hypertext mark up language conversion unit for producing an alarm information list of hypertext mark up language format based on the alarm information and the alarm images and log information of the alarm management unit; and
   a hypertext transfer protocol server unit for interpreting the request for the alarm image list and transmitting the alarm list.

21. A network surveillance unit in accordance with claim 20, wherein the alarm HTML conversion unit converts a specific character string in an HTML file into an alarm number and an alarm image number designated by a terminal.

22. A network surveillance unit in accordance with claim 21, wherein the alarm HTML conversion unit converts a specific character string in the HTML file into the number of an image immediately following the alarm image number designated by the terminal, the number of an image immediately preceding to the alarm image number designated by the terminal, the first image number and the last image number of the alarm designated by the terminal, and the image number immediately after alarm generation.

23. A network surveillance unit in accordance with claim 1, 2 or 10, comprising:
   an alarm management unit for instructing the communication unit to transmit the alarm information upon alarm generation;
   an alarm message production unit for producing an alarm message of a format in which the alarm information conforms with the browsing means of the terminal; and
   a communication unit for transmitting the alarm message according to a request of the alarm management unit.

24. A network surveillance unit in accordance with claim 1, 2 or 10, comprising:
   an alarm management unit for instructing the communication unit to transmit the alarm information upon alarm generation;

an alarm mail production unit for producing an internet mail including the alarm information; and another communication unit for transmitting the mail according to a request of the alarm management unit.

25. A network surveillance unit in accordance with claim 1 or 2, comprising:

an image input unit for adding a different identifier for each image frame at the time of image input; and an image identifier generating unit for generating the identifier, wherein the image input unit adds a different identifier for each image frame at a time of image input.

26. A network surveillance unit in accordance with claim 25, comprising another communication unit for transmitting a latest image stored in the coded image storage unit to the network in a case where the identifier of the latest image at a time of image transmission is different from the identifier of the image at a previous time of transmission, and for storing in the coded image storage unit the latest image whose identifier is different from a previously transmitted image and then transmitting the same latest image to the network in the case where the two identifiers are the same.

27. A network surveillance unit in accordance with claim 25, comprising another communication unit for transmitting to the network a latest image stored in the coded image storage unit in a case where the identifier of the latest image at a time of image transmission is different from the identifier of the image at a previous time of transmission, and for transmitting to the network information that the latest image is not existent in a case where the two identifiers are the same.

28. A network surveillance unit in accordance with claim 1, comprising:

another communication unit for receiving a control instruction for a camera or a video output device from a terminal through the network;

a camera control unit for interpreting the other communication unit, and for converting the other communication unit to a control instruction specific to the camera or the video output device; and a coaxial multiplexing unit for multiplexing a control instruction output from the camera control unit on a coaxial cable and a video input from the camera or the video output device on the coaxial cable to perform input/output operation on the same coaxial cable.

29. A network surveillance unit in accordance with claim 28 or 3, wherein the alarm management unit sends a switching instruction of a coaxial channel to the coaxial input/output switching unit and a camera controlling instruction to the camera control unit in accordance with a setting registered in advance upon alarm generation.

30. A network surveillance unit in accordance with claim 1, comprising a coaxial multiplexing unit for demultiplexing an alarm input and an image input which are multiplexed and transmitted from a camera or a video output device through a coaxial cable, a video signal being sent to the image input unit, and an alarm signal being sent to the alarm management unit.

31. A network surveillance unit in accordance with claim 30 or 4, comprising a coaxial multiplexing unit for multiplexing or demultiplexing the alarm input and the image input which are multiplexed and transmitted from the camera or the video output device through the coaxial cable, and wherein a control signal applied to the camera or the video output device is also multiplexed on the coaxial cable.

32. A network surveillance unit in accordance with claim 31 wherein the alarm management unit sends a switching instruction of the coaxial channels to the coaxial input/output switching unit and sends a camera controlling instruction to a camera control unit in accordance with a setting registered in advance upon alarm generation from the camera or the video output device.

33. A network surveillance unit in accordance with claim 1 or 2, comprising a coaxial multiplexing unit for multiplexing a video input from a camera or a video output device on a coaxial cable with a power supplied from a power supply in the network surveillance unit to the camera or the video output device to perform input/output operation on the coaxial cable.

34. A network surveillance unit in accordance with claim 1 or 2, wherein said alarm management unit sends an external control instruction to an external equipment control unit in accordance with a setting registered in advance upon alarm generation; and said network surveillance unit further comprises an external equipment control unit for converting the external control instruction to an instruction specific to external equipment to be controlled, and for sending the instruction to the external equipment.

35. A network surveillance unit in accordance with claim 1 or 2, comprising a display lamp for displaying a connection state to the network, a transmission state, a reception state and an operation mode on a front surface of a housing.

36. A network surveillance unit in accordance with claim 1 or 2, comprising a first interface with a personal computer for setting an operating environment on front and back surfaces of a housing or updating a software in the surveillance unit.

37. A network surveillance unit in accordance with claim 36, comprising:

second interface for a personal computer, the first and second interfaces on the front and back surfaces of the housing, respectively; and a switch for switching the first and second interfaces on the front and back surfaces of the housing.

38. A network surveillance unit in accordance with claim 1 or 2, further comprising a housing including means for inputting an image from a camera or a video output device and loop-through output means for directly outputting the image.

39. A network surveillance unit in accordance with claim 28 or 34, comprising:

a camera control unit for transmitting a control instruction to a camera or a video output device;

a hyper text transfer protocol (HTTP) server unit for decomposing a composite operating instruction from the display terminal into a chain of basic control instructions for the camera control unit, and for sending the instructions to the camera control unit, wherein the camera control unit transmits the basic control instructions to the camera or the video output device sequentially.

40. A network surveillance unit in accordance with claim 39, comprising:

a camera control unit for transmitting a control instruction to a camera or a video output device; and a hyper text transfer protocol (HTTP) server unit for decomposing a composite operating instruction from the display terminal into a chain of basic control instructions and inter-instruction time intervals for the camera control unit, and for sending the chain of basic control instructions to the camera control unit, wherein:

the camera control unit transmits the basic control instructions to the camera or the video output device sequentially in accordance with the inter-instruction time intervals.

* * * * *